United States Patent
Cronin

(10) Patent No.: US 12,194,886 B2
(45) Date of Patent: Jan. 14, 2025

(54) SYSTEM AND METHOD FOR ANALYZING TEMPERATURE CHANGES IN SUPERCAPACITOR BATTERY STORAGE FOR ELECTRIC VEHICLE

(71) Applicant: SUSTAINABLE ENERGY TECHNOLOGIES, INC., Wilmington, DE (US)

(72) Inventor: John Cronin, Wilmington, DE (US)

(73) Assignee: SUSTAINABLE ENERGY TECHNOLOGIES, INC., Wilmington, DE (US)

( * ) Notice: Subject to any disclaimer, the term of this patent is extended or adjusted under 35 U.S.C. 154(b) by 121 days.

(21) Appl. No.: 18/076,321

(22) Filed: Dec. 6, 2022

(65) Prior Publication Data

US 2023/0182621 A1    Jun. 15, 2023

Related U.S. Application Data

(60) Provisional application No. 63/286,428, filed on Dec. 6, 2021.

(51) Int. Cl.
*B60L 58/24* (2019.01)
*B60L 3/00* (2019.01)
*H01M 10/633* (2014.01)

(52) U.S. Cl.
CPC ............ *B60L 58/24* (2019.02); *B60L 3/0046* (2013.01); *H01M 10/633* (2015.04); *B60L 2240/545* (2013.01)

(58) Field of Classification Search
CPC .. B60L 58/24; B60L 3/0046; B60L 2240/545; B60L 58/10; B60L 3/12;
(Continued)

(56) References Cited

U.S. PATENT DOCUMENTS 6,011,379 A    1/2000  Singh et al.
6,724,102 B1   4/2004  Kelwaski et al.
(Continued)

FOREIGN PATENT DOCUMENTS

CN    104057901    9/2014
CN    106252096    12/2016
(Continued)

OTHER PUBLICATIONS

"200-MHz 16 x 16 Video Crosspoint Switch IC," Analogue Dialogue, Apr. 1997, vol. 31, No. 2, 25 pages; https://www.analog.com/en/analog-dialogue/articles/200-mhz-16x16-video-crosspoint-switch-ic.html.
(Continued)

*Primary Examiner* — Yuen Wong
(74) *Attorney, Agent, or Firm* — Polsinelli LLP

(57) ABSTRACT

Disclosed herein are systems and methods for temperature-based vehicle operation analysis. A thermal sensor measures a temperature associated with an energy storage unit that stores energy. A vehicle attribute sensor measures one or more attributes of a vehicle. The energy storage unit is configured to power a propulsion mechanism of the vehicle. A control system with a processor and memory identifies an effect of the measured temperature associated with the energy storage unit on the one or more attributes of the vehicle. The control system identifies a change to vehicle operation of the vehicle based on the identified effect of the measured temperature associated with the energy storage unit on the one or more attributes of the vehicle. An output interface outputs an indication of the change to vehicle operation of the vehicle.

20 Claims, 6 Drawing Sheets

(58) Field of Classification Search
CPC .............. B60L 58/12; H01M 10/633; H01M 2010/4278; H01M 2220/20; H01M 10/486

See application file for complete search history.

(56) References Cited

U.S. PATENT DOCUMENTS

| | | |
|---|---|---|
| 7,548,894 B2 | 6/2009 | Fuji |
| 8,881,832 B2 | 11/2014 | McMillon et al. |
| 8,950,662 B2 | 2/2015 | Soborski |
| 9,053,870 B2 | 6/2015 | Yu et al. |
| 9,056,556 B1 | 6/2015 | Hyde et al. |
| 9,070,505 B2 | 6/2015 | Saitoh |
| 9,079,505 B1 | 7/2015 | Hyde et al. |
| 9,145,760 B2 | 9/2015 | McMillon et al. |
| 9,169,719 B2 | 10/2015 | McMillon et al. |
| 9,233,860 B2 | 1/2016 | Liu et al. |
| 9,318,271 B2 | 4/2016 | Fletcher et al. |
| 9,379,546 B2 | 6/2016 | Li |
| 9,519,942 B2 | 12/2016 | Soborski |
| 9,940,572 B2 | 4/2018 | Soborski |
| 10,061,958 B2 | 8/2018 | Voigt et al. |
| 10,173,663 B1 | 1/2019 | Combs |
| 10,235,597 B2 | 3/2019 | Voigt et al. |
| 10,380,601 B2 | 8/2019 | Soborski |
| 10,826,304 B1 | 11/2020 | Thomas et al. |
| 2004/0036475 A1 | 2/2004 | Pascoe et al. |
| 2005/0057098 A1 | 3/2005 | Bouchon |
| 2006/0132102 A1 | 6/2006 | Harvey |
| 2006/0178170 A1 | 8/2006 | Chung et al. |
| 2006/0284617 A1 | 12/2006 | Kozlowski et al. |
| 2006/0285617 A1 | 12/2006 | Roberts et al. |
| 2007/0080662 A1 | 4/2007 | Wu |
| 2007/0258188 A1 | 11/2007 | Shiue et al. |
| 2008/0276825 A1 | 11/2008 | King et al. |
| 2009/0021871 A1 | 1/2009 | Moran et al. |
| 2010/0060231 A1 | 3/2010 | Trainor et al. |
| 2010/0116574 A1 | 5/2010 | Gilmore |
| 2010/0123436 A1 | 5/2010 | Herrod et al. |
| 2010/0225282 A1 | 9/2010 | Paasch |
| 2010/0305792 A1 | 12/2010 | Wilk et al. |
| 2011/0003188 A1 | 1/2011 | Cheng et al. |
| 2011/0080133 A1 | 4/2011 | Tamburrino et al. |
| 2012/0029724 A1 | 2/2012 | Formanski et al. |
| 2012/0041626 A1 | 2/2012 | Kelty et al. |
| 2012/0049621 A1 | 3/2012 | Shinoda |
| 2012/0062186 A1 | 3/2012 | Dessirier et al. |
| 2012/0136535 A1 | 5/2012 | Buford et al. |
| 2012/0183815 A1 | 7/2012 | Johnston et al. |
| 2012/0187906 A1 | 7/2012 | Martienssen et al. |
| 2012/0293077 A1 | 11/2012 | Tousain et al. |
| 2013/0030630 A1 | 1/2013 | Luke et al. |
| 2013/0033203 A1 | 2/2013 | Luke et al. |
| 2013/0162037 A1 | 6/2013 | Kim et al. |
| 2013/0179061 A1 | 7/2013 | Gadh et al. |
| 2013/0181680 A1 | 7/2013 | Chau |
| 2013/0188283 A1 | 7/2013 | Midholm et al. |
| 2014/0129040 A1 | 5/2014 | Emadi et al. |
| 2015/0046012 A1 | 2/2015 | Chen et al. |
| 2015/0047844 A1 | 2/2015 | McMillon et al. |
| 2015/0077054 A1 | 3/2015 | Uyeki |
| 2015/0274030 A1 | 10/2015 | Payne et al. |
| 2015/0275788 A1 | 10/2015 | Dufford et al. |
| 2016/0079633 A1 | 3/2016 | Wahlstrom et al. |
| 2016/0167677 A1 | 6/2016 | Schaefer et al. |
| 2016/0176298 A1 | 6/2016 | Watson et al. |
| 2016/0283842 A1 | 9/2016 | Pescianschi |
| 2016/0288666 A1 | 10/2016 | Kim et al. |
| 2016/0297316 A1 | 10/2016 | Penilla et al. |
| 2016/0301246 A1 | 10/2016 | Sato |
| 2016/0349330 A1 | 12/2016 | Barfield, Jr. et al. |
| 2016/0365833 A1 | 12/2016 | Saby et al. |
| 2016/0375780 A1 | 12/2016 | Penilla et al. |
| 2016/0375786 A1 | 12/2016 | Liu |
| 2016/0380455 A1 | 12/2016 | Greening et al. |
| 2017/0001585 A1 | 1/2017 | Fink |
| 2017/0109467 A1 | 4/2017 | Shimizu |
| 2017/0234251 A1 | 8/2017 | Commenda et al. |
| 2018/0074132 A1 | 3/2018 | Day et al. |
| 2018/0134171 A1 | 5/2018 | Hyde et al. |
| 2018/0137991 A1 | 5/2018 | Roumi et al. |
| 2018/0236887 A1 | 8/2018 | Sarkar et al. |
| 2018/0283887 A1 | 10/2018 | Dudar et al. |
| 2019/0031125 A1 | 1/2019 | Rozman et al. |
| 2019/0061541 A1 | 2/2019 | Penilla et al. |
| 2019/0097362 A1 | 3/2019 | Haba et al. |
| 2019/0107406 A1* | 4/2019 | Cox .................. G01S 19/42 |
| 2019/0180949 A1 | 6/2019 | Liu et al. |
| 2019/0196851 A1 | 6/2019 | Penilla et al. |
| 2020/0070679 A1 | 3/2020 | Wang et al. |
| 2020/0079223 A1 | 3/2020 | Puri et al. |
| 2020/0094810 A1 | 3/2020 | Moreland |
| 2020/0247239 A1 | 8/2020 | Stoltz |
| 2020/0328622 A1 | 10/2020 | Abu Qahouq |
| 2020/0365336 A1 | 11/2020 | Luo et al. |
| 2021/0005939 A1 | 1/2021 | Tajima et al. |
| 2021/0083345 A1 | 3/2021 | Ciaccio et al. |
| 2021/0088591 A1 | 3/2021 | Naha et al. |
| 2021/0123975 A1 | 4/2021 | Sarwat et al. |
| 2021/0138927 A1 | 5/2021 | Maeng et al. |
| 2021/0190868 A1 | 6/2021 | Benoit et al. |
| 2021/0202989 A1 | 7/2021 | Lee et al. |
| 2021/0237578 A1 | 8/2021 | Ing |
| 2021/0284043 A1 | 9/2021 | Wang et al. |
| 2023/0136195 A1 | 5/2023 | Cronin |
| 2023/0170732 A1 | 6/2023 | Cronin |
| 2023/0173923 A1 | 6/2023 | Cronin |
| 2023/0173936 A1 | 6/2023 | Cronin |
| 2023/0173949 A1 | 6/2023 | Cronin |
| 2023/0174041 A1 | 6/2023 | Cronin |
| 2023/0176635 A1 | 6/2023 | Cronin |
| 2023/0182580 A1 | 6/2023 | Cronin |
| 2023/0182616 A1 | 6/2023 | Cronin |
| 2023/0182617 A1 | 6/2023 | Cronin |
| 2023/0187960 A1 | 6/2023 | Cronin |
| 2023/0192063 A1 | 6/2023 | Cronin |
| 2023/0211667 A1 | 7/2023 | Cronin |
| 2023/0216317 A1 | 7/2023 | Cronin |
| 2023/0223784 A1 | 7/2023 | Cronin |
| 2023/0326268 A1 | 10/2023 | Cronin |
| 2024/0181927 A1 | 6/2024 | Cronin |

FOREIGN PATENT DOCUMENTS

| | | |
|---|---|---|
| CN | 106252099 | 12/2016 |
| CN | 109888904 | 10/2020 |
| EP | 2 278 677 | 1/2011 |
| WO | WO 2014/107151 | 7/2014 |
| WO | WO 2014/165197 | 10/2014 |
| WO | WO 2015/016965 | 2/2015 |
| WO | WO 2018/231932 | 12/2016 |
| WO | WO 2018/041095 | 3/2018 |
| WO | WO 2018/106799 | 6/2018 |
| WO | WO 2019/224527 | 11/2019 |
| WO | WO 2020/240148 | 12/2020 |
| WO | WO 2021/122753 | 6/2021 |
| WO | WO 2023/076632 | 5/2023 |
| WO | WO 2023/102265 | 6/2023 |
| WO | WO 2023/102266 | 6/2023 |
| WO | WO 2023/102267 | 6/2023 |
| WO | WO 2023/102269 | 6/2023 |
| WO | WO 2023/102274 | 6/2023 |
| WO | WO 2023/107502 | 6/2023 |
| WO | WO 2023/107503 | 6/2023 |
| WO | WO 2023/107504 | 6/2023 |
| WO | WO 2023/107505 | 6/2023 |
| WO | WO 2023/107513 | 6/2023 |
| WO | WO 2023/107514 | 6/2023 |
| WO | WO 2023/107752 | 6/2023 |
| WO | WO 2023/114326 | 6/2023 |
| WO | WO 2023/129639 | 7/2023 |
| WO | WO 2023/129707 | 7/2023 |
| WO | WO 2023/129739 | 7/2023 |
| WO | WO 2023/215003 | 11/2023 |

(56) References Cited

FOREIGN PATENT DOCUMENTS

OTHER PUBLICATIONS

"8x8 Analog Crosspoint Switches Analog & Digital Crosspoint ICs," Mouser Electronics, [Downloaded on Internet: Feb. 21, 2023], 5 pages, https://www.mouser.com/c/semiconductors/communication-networking-ics/analog-digital-crosspoint-ics.
Camara et al., "Polynomial Control Method of DC/DC Converters for DC-Bus Voltage and Currents Management—Battery and Supercapacitors," IEEE Transaction on Power Electronics, vol. 27, No. 3 (Mar. 2012): 1455-1467, DOI: 10.1109/TPEL.2011.2164581.
Crossbar Switch—Wikipedia, [Downloaded from Internet: Feb. 21, 2023], 7 pages; https://en.wikipedia.org/wiki/Crossbar_switch.
Danila et al., Elena; "Dynamic Modelling of Supercapacitor Using Artificial Neural Network Technique," International Conference and Exposition on Electrical and Power Engineering, Oct. 2014, DOI: 10.1109/ICEPE.2014.6969988 and https://www.researchgate.net/publication/270888480_Dynamic_Modelling_of_Supercapacitor_Using_Artificial_Neural_Network_Technique.
"Details, datasheet, quote on part No. BQ24640RVAR—High Efficienty Synchronous Switch-Mode Battery Charge Controller for Super Capacitors," Texas Instruments, SLUSA44A—Mar. 2010—Revised Jul. 2015, 31 pages, https://www.digchip.com/datasheets/%203258066-bq24640rvar.html.
"Digital Crosspoint Switches," MicroSemi Corp. (Aliso Viego, CA), [Downloadaed from Internet Feb. 21, 23], 2 pages, https://www.microsemi.com/product-directory/signal-integrity/3579-digital-crosspoint-switches.
Eddahech et al., Akram; "Modeling and adaptive control for supercapacitor in automotive applications based on artificial neural networks," Electric Power Systems Research, vol. 106 (Jan. 2014): 134-141, https://www.sciencedirect.com/science/article/abs/pii/S0378779613002265.
Ge et al., Yuru; "How to measure and report the capacity of electrochemical double layers, supercapacitors, and their electrode materials," Journal of Solid State Electrochemistry, vol. 24 (2020): 3215-3230, https://link.springer.com/article/10.1007/s10008-020-04804-x.
Haddoun, Abdelhakim; "Modeling, Analysis, and Neural Network Control of an EV Electrical Differential," IEEE Transactions on Industrial Electronics, vol. 55, No. 6 (Jun. 2008): 2286-94, https://www.researchgate.net/publication/3219993.
Lin et al., Tianquan; "Nitrogen-doped mesoporous carbon of extraordinary capacitance for electrochemicalenergy storage," Science (new series), vol. 350, No. 6267 (Dec. 18, 2015): 1508-1513https://www.jstor.org/stable/24741499.
Marie-Francoise et al., Jean-Noel; "Supercapacitor modeling with Artificial Neural Network (ANN)," 2004, https://www.osti.gov/etdeweb/servlets/purl/20823689.
"Micrel™ 2.5V/3.3V 3.0 GHz Dual 2x2 CML Crosspoint Switch w/ Internal Termination, SuperLite™ SY55858U," Nov. 2005, 8 pages, http://ww1.microchip.com/downloads/en/DeviceDoc/sy55858u.pdf.
Surewaard et al., Erik; "A Comparison of Different Methods for Battery and Supercapacitor Modeling," SAE Transactions, Journal of Engines, vol. 112, Section 3 (2003): 1851-1859, https://www.jstor.org/stable/44741399.
"Testing Super-Capacitors, Part 1: CV, EIS, and Leakage Current," Apr. 16, 2015, 11 pages, https://www.gamry.com/assets/Uploads/Super-capacitors-part-1-rev-2.pdf.
"Testing Electrochemical Capacitors Part 2—Cyclic Charge Discharge and Stacsk," Nov. 14, 2011, 11 pages; https://www.gamry.com/assets/Application-Notes/Testing-Super-Capacitors-Pt2.pdf.
"Understanding Tree and Crosspoint Matrix Architectures." Pickering Test, [Downloaded from Internet: Feb. 21, 2023], 7 pages, https://www.pickeringtest.com/en-us/kb/hardware-topics/switching-architectures/understanding-tree-and-crosspoint-matrix-architectures.
PCT Application No. PCT/US2022/052054, International Search Report and Written Opinion dated Feb. 5, 2024.
Kokate et al., "Retrofitting of Auto Rickshaw to E-Rickshaw—A Feasibility Study", 2020 First International Conference on Power, Control and Computing Technologies (ICPC2T), IEEE, URL: https://ieeexplore.ieee.org/stamp/stamp.jsp?tp=&arnumber=9071492> entire document.
PCT Application No. PCT/US2022/048287, International Preliminary Report on Patentability dated May 10, 2024.
PCT Application No. PCT/US2022/051865, International Preliminary Report on Patentability dated Jun. 13, 2024.
PCT Application No. PCT/US2022/051863, International Preliminary Report on Patentability dated Jun. 13, 2024.
PCT Application No. PCT/US2022/051867, International Preliminary Report on Patentability dated Jun. 13, 2024.
PCT Application No. PCT/US2022/51870, International Preliminary Report on Patentability dated Jun. 13, 2024.
PCT Application No. PCT/US2022/051881, International Search Report and Written Opinion dated May 26, 2023.
PCT Application No. PCT/US2022/051881, International Preliminary Report on Patentability dated Jun. 13, 2024.
PCT Application No. PCT/US2022052033, International Preliminary Report on Patentability dated Jun. 20, 2024.
PCT Application No. PCT/US2022/052034, International Preliminary Report on Patentability dated Jun. 20, 2024.
PCT Application No. PCT/US2022/052045, International Preliminary Report on Patentability dated Jun. 20, 2024.
PCT Application No. PCT/US2022/052054, International Preliminary Report on Patentability dated Jun. 20, 2024.
PCT Application No. PCT/US2022/052035, International Preliminary Report on Patentability dated Jun. 20, 2024.
PCT Application No. PCT/US2022/052036, International Preliminary Report on Patentability dated Jun. 20, 2024.
PCT Application No. PCT/US2022/052049. International Preliminary Report on Patentability dated Jun. 20, 2024.
PCT Application No. PCT/US2022/052602, International Preliminary Report on Patentability dated Jun. 20, 2024.
PCT Application No. PCT/US2022/052890, International Preliminary Report on Patentability dated Jun. 27, 2024.
PCT Application No. PCT/US2022/054386, International Preliminary Report on Patentability dated Jul. 11, 2024.
PCT Application No. PCT/US2022/054226, International Preliminary Report on Patentability dated Jul. 11, 2024.
PCT Application No. PCT/US2022/054334, International Preliminary Report on Patentability dated Jul. 11, 2024.
U.S. Appl. No. 18/079,841, Office Action dated Mar. 22, 2024.
U.S. Appl. No. 18/081,508, Office Action dated Apr. 9, 2024.
PCT Application No. PCT/US22/51881 Invitation to Pay Additional Fees dated Mar. 2, 2023.
PCT Application No. PCT/US2022/051867 International Search Report and Written Opinion dated Mar. 7, 2023.
PCT Application No. PCT/US22/52033 International Search Report and Written Opinion dated Mar. 8, 2023.
PCT Application No. PCT/US22/52049 International Search Report and Written Opinion dated Mar. 8, 2023.
PCT Application No. PCT/US2022/048287 International Search Report and Written Opinion dated Mar. 10, 2023.
PCT Application No. PCT/US22/52035 International Search Report and Written Opinion dated Mar. 14, 2023.
PCT Application No. PCT/US2022/051863 International Search Report and Written Opinion dated Mar. 17, 2023.
PCT Application No. PCT/US22/52034 International Search Report and Written Opinion dated Mar. 20, 2023.
PCT Application No. PCT/US22/52890 International Search Report and Written Opinion dated Mar. 20, 2023.
PCT Application No. PCT/US22/52045 International Search Report and Written Opinion dated Mar. 21, 2023.
PCT Application No. PCT/US22/52036 International Search Report and Written Opinion dated Mar. 30, 2023.
PCT Application No. PCT/US22/52602 International Search Report and Written Opinion dated Apr. 4, 2023.
PCT Application No. PCT/US22/51870 International Search Report and Written Opinion dated Apr. 5, 2023.

(56) References Cited

OTHER PUBLICATIONS

PCT Application No. PCT/US22/54334 International Search Report and Written Opinion dated Apr. 5, 2023.
PCT Application No. PCT/US22/54386 International Search Report and Written Opinion dated Apr. 12, 2023.
PCT Application No. PCT/US22/54226 International Search Report and Written Opinion dated Apr. 18, 2023.
PCT Application No. PCT/US2022/051865 International Search Report and Written Opinion dated May 2, 2023.
Sarwar et al. "Experimental analysis of Hybridised Energy Storage Systems for automotive applications." Journal of Power Sources 324 (2016): 388-401. Aug. 30, 2016 (Aug. 30, 2016) Retrieved on Feb. 11, 2023 (Feb. 11, 2023) from <https://www.sciencedirect.com/science/article/abs/pii/S0378775316306784>.
U.S. Appl. No. 18/075,333, Office Action dated Sep. 25, 2024.
U.S. Appl. No. 18/075,338, Office Action dated Nov. 6, 2024.
U.S. Appl. No. 18/076,259, Office Action dated Sep. 13, 2024.
Tesla, Model S Owner's Manual, May 16, 2019.

\* cited by examiner

SYSTEM AND METHOD FOR ANALYZING TEMPERATURE CHANGES IN SUPERCAPACITOR BATTERY STORAGE FOR ELECTRIC VEHICLE

CROSS-REFERENCE TO RELATED APPLICATIONS

This application claims the benefit of U.S. Provisional Application No. 63/286,428, filed Dec. 6, 2021, for "SYSTEM AND METHOD FOR ANALYZING TEMPERATURE CHANGES IN SUPERCAPACITOR BATTERY STORAGE FOR ELECTRIC VEHICLE," the disclosure of which is incorporated herein by reference in its entirety.

FIELD OF THE DISCLOSURE

The present disclosure is generally related to determining associations between thermal information measured at energy storage unit(s) of a vehicle and operation of the vehicle.

BACKGROUND

Some vehicles, such as electric vehicles or hybrid vehicles, include energy storage units such as batteries to power components and subsystems of the vehicles. For instance, in some vehicles, power from the energy storage units is used to power propulsion mechanisms, such as motors and/or engines, that propel the vehicle. In some cases, the temperature of an energy storage unit can change (e.g., increase or decrease) based on the flow of power to or from the energy storage unit to charge or discharge the energy storage unit. In some cases, the temperature of an energy storage unit can change the ability of the energy storage unit to safely receive or provide further power to charge or discharge the energy storage unit. If the energy storage unit is part of a vehicle, the temperature of the energy storage unit can affect the capabilities of the vehicle, for instance how quickly the vehicle can accelerate or brake. A supercapacitor is a type of capacitor that can be used as an energy storage unit.

SUMMARY

Disclosed herein are systems and methods for temperature-based vehicle operation analysis. A thermal sensor measures a temperature associated with an energy storage unit that stores energy. A vehicle attribute sensor measures one or more attributes of a vehicle. The energy storage unit is configured to power a propulsion mechanism of the vehicle. A control system with a processor and memory identifies an effect of the measured temperature associated with the energy storage unit on the one or more attributes of the vehicle. The control system identifies a change to vehicle operation of the vehicle based on the identified effect of the measured temperature associated with the energy storage unit on the one or more attributes of the vehicle. An output interface outputs an indication of the change to vehicle operation of the vehicle.

In an illustrative example, a system is disclosed for vehicle energy architecture customization. The system comprises: an energy storage unit that is configured to store energy; a thermal sensor that is configured to measure a temperature associated with the energy storage unit; a vehicle attribute sensor that is configured to measure one or more attributes of a vehicle, wherein the energy storage unit is configured to power a propulsion mechanism of the vehicle: a control system comprising a processor with access to a memory, wherein the control system is configured to identify an effect of the measured temperature associated with the energy storage unit on the one or more attributes of the vehicle, wherein the control system is configured to identify a change to vehicle operation of the vehicle based on the identified effect of the measured temperature associated with the energy storage unit on the one or more attributes of the vehicle; and an output interface coupled to the control system and configured to output an indication of the change to vehicle operation of the vehicle.

In another illustrative example, a method is disclosed for vehicle energy architecture customization. The method comprises: measuring a temperature associated with the energy storage unit using a thermal sensor, wherein the energy storage unit is configured to store energy; measuring one or more attributes of a vehicle using a vehicle attribute sensor, wherein the energy storage unit is configured to power a propulsion mechanism of the vehicle; identifying an effect of the measured temperature associated with the energy storage unit on the one or more attributes of the vehicle; identifying a change to vehicle operation of the vehicle based on the identified effect of the measured temperature associated with the energy storage unit on the one or more attributes of the vehicle; and outputting an indication of the change to vehicle operation of the vehicle using an output interface.

BRIEF DESCRIPTIONS OF THE DRAWINGS

The accompanying drawings illustrate various embodiments of systems, methods, and other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
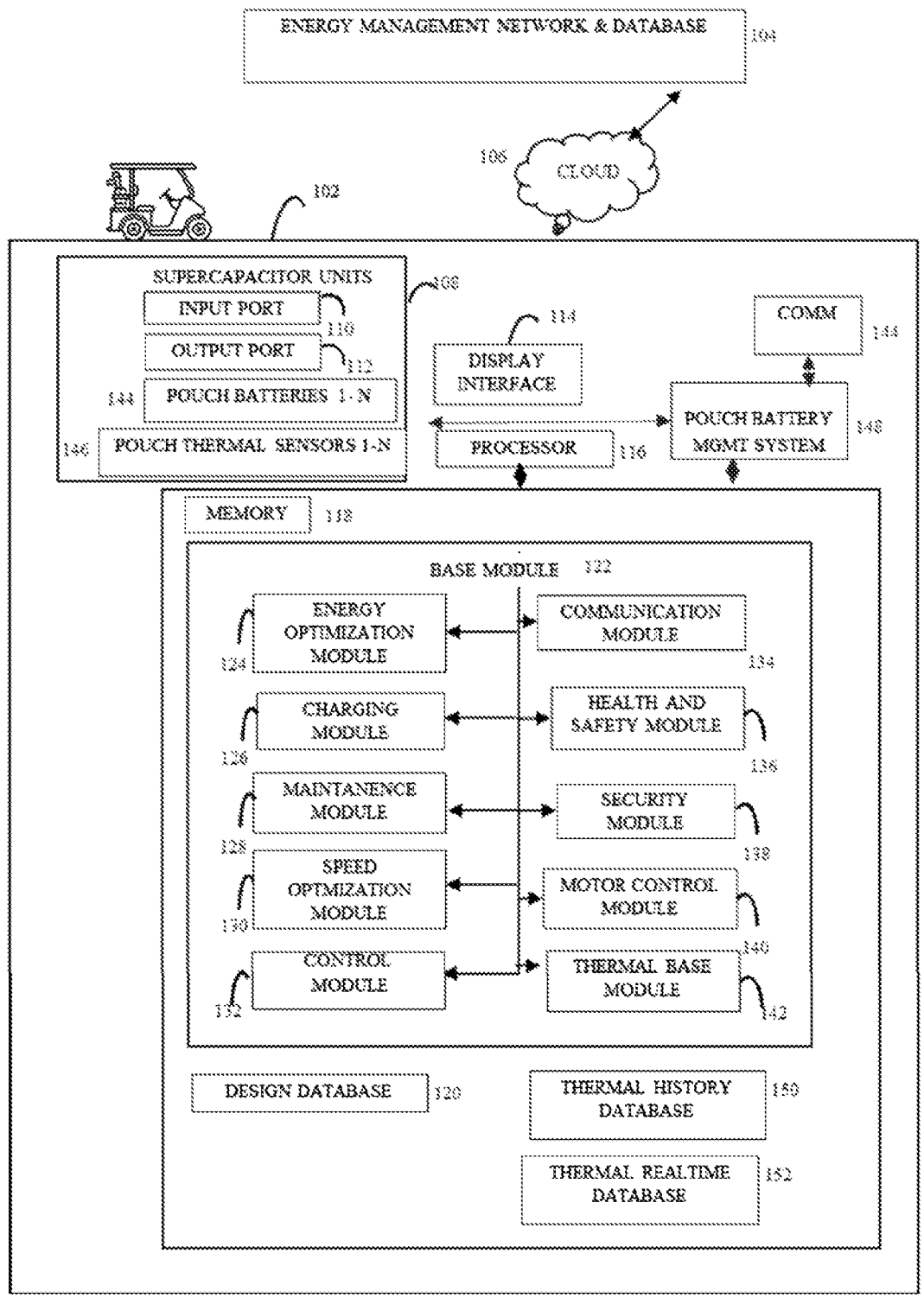
FIG. 1 is a block diagram illustrating an architecture of an energy management system, according to some examples.

Aspects of the present disclosure are disclosed in the following description and related figures directed to specific embodiments of the disclosure. Those of ordinary skill in the art will recognize that alternate embodiments may be devised without departing from the claims' spirit or scope. Additionally, well-known elements of exemplary embodiments of the disclosure will not be described in detail or will be omitted so as not to obscure the relevant details of the disclosure.

As used herein, the word exemplary means serving as an example, instance, or illustration. The embodiments described herein are not limiting but rather are exemplary only. It should be understood that the described embodiments are not necessarily to be construed as preferred or advantageous over other embodiments. Moreover, the terms embodiments of the disclosure, embodiments, or disclosure do not require that all embodiments include the discussed feature, advantage, or mode of operation.

Further, many of the embodiments described herein are described in sequences of actions to be performed by, for example, elements of a computing device. It should be recognized by those skilled in the art that specific circuits can perform the various sequence of actions described herein (e.g., application-specific integrated circuits (ASICs)) and/or by program instructions executed by at least one processor. Additionally, the sequence of actions described herein can be embodied entirely within any form of computer-readable storage medium. The execution of the sequence of actions enables the processor to perform the functionality described herein. Thus, the various aspects of the present disclosure may be embodied in several different forms, all of which have been contemplated to be within the scope of the claimed subject matter. In addition, for each of the embodiments described herein, the corresponding form of any such embodiments may be described herein as, for example, a computer configured to perform the described action.

Disclosed herein are systems and methods for temperature-based vehicle operation analysis. A thermal sensor measures a temperature associated with an energy storage unit that stores energy. A vehicle attribute sensor measures one or more attributes of a vehicle. The energy storage unit is configured to power a propulsion mechanism of the vehicle. A control system with a processor and memory identifies an effect of the measured temperature associated with the energy storage unit on the one or more attributes of the vehicle. The control system identifies a change to vehicle operation of the vehicle based on the identified effect of the measured temperature associated with the energy storage unit on the one or more attributes of the vehicle. An output interface outputs an indication of the change to vehicle operation of the vehicle.

A summary of the terminology used herein is provided concerning the embodiments.

Energy Storage Unit (ESU):

The ESU is a device that can store and deliver charge. It may comprise one or more power packs, which may comprise supercapacitors. The energy storage module may also comprise batteries, hybrid systems, fuel cells, etc. Capacitance provided in the components of the ESU may be in the form of electrostatic capacitance, pseudocapacitance, electrolytic capacitance, electronic double-layer capacitance, and electrochemical capacitance, and a combination thereof, such as both electrostatic double-layer capacitance and electrochemical pseudocapacitance, as may occur in supercapacitors. The ESU may be associated with or comprise control hardware and software with suitable sensors, as needed, for an energy control system (ECS) to manage any of the following: temperature control, discharging of the ESU whether collectively or of any of its components, charging of the ESU whether collectively or of any of its components, maintenance, interaction with batteries, battery emulation, communication with other devices, including devices that are directly connected, adjacent, or remotely such as by wireless communication, etc. In some aspects, the ESU may be portable and provided in a casing containing at least some components of the energy control system (ECS) and features such as communication systems, a display interface, etc.

Energy Control System (ECS)

The energy control system (ECS) combines hardware and software that manages various aspects of the ESU, including its energy to the device. The ECS regulates the energy storage unit (ESU) to control discharging, charging, and other features as desired, such as temperature, safety, efficiency, etc. The ESU may be adapted to give the ECS individual control over each power pack or optionally over each supercapacitor or grouped supercapacitor unit to tap the available power of individual supercapacitors efficiently and to properly charge individual supercapacitors rather than merely providing a single level of charge for the ESU as a whole that may be too little or too much for individual supercapacitors or their power packs.

The ECS may comprise or be operatively associated with a processor, a memory comprising code for the controller, a database, and communication tools such as a bus or wireless capabilities for interacting with an interface or other elements or otherwise providing information, information requests, or commands. The ECS may interact with individual power packs or supercapacitors through a crosspoint switch or other matrix systems. Farther, the ECS may obtain information from individual power packs or their supercapacitors through similar switching mechanisms or direct wiring in which, for example, one or more of a voltage detection circuit, an amperage detection circuit, a temperature sensor, and other sensors or devices may be used to provide details on the level of charge and performance of the individual power pack or supercapacitor.

The ECS may comprise one or more modules that the processor can execute or govern according to code stored in a memory such as a chip, a hard drive, a cloud-based source, or another computer-readable medium.

The ECS may therefore manage any or all of the following: temperature control, discharging of the ESU whether collectively or of any of its components, charging of the ESU whether collectively or of any of its components, maintenance, interaction with batteries, or battery emulation, and communication with other devices, including devices that are directly connected, adjacent, or remotely such as by wireless communication.

The ECS may comprise one or more energy source modules that govern specific energy storage devices, such as a supercapacitor module for governing supercapacitors and a lithium module for governing lithium batteries. A lead-acid module for governing lead-acid batteries and a hybrid module for governing the combined cooperative use of a supercapacitor and a battery. Each of the energy storage modules may comprise software encoding algorithms for control such as for discharge or charging or managing individual energy sources, and may comprise or be operationally associated with hardware for redistributing charge among the energy sources to improve the efficiency of the ESU, for monitoring charge via charge measurement systems such as circuits for determining the charge state of the respective energy sources, etc., and may comprise or be operationally associated with devices for receiving and sending information to and from the ECS or its other modules, etc. The energy source modules may also cooperate with a charging module responsible for guiding the charging of the overall ESU to ensure a properly balanced charge and a discharge module that guides the efficient discharging of the ESU during use which may also seek to provide proper balance in the discharging of the energy sources.

The term supercapacitor as used herein can also refer to an ultracapacitor, which is an electrical component capable of holding hundreds of times more electrical charge quantity than a standard capacitor. This characteristic makes ultracapacitors useful in devices that require relatively little current and low voltage. In some situations, an ultracapacitor can take the place of a rechargeable low-voltage electrochemical battery. In some examples, the terms supercapacitor or ultracapacitor as used herein can also refer to other types of capacitors.

The BCS may further comprise a dynamic module for managing changing requirements in power supplied. In some aspects, the dynamic module comprises anticipatory algorithms that seek to predict upcoming changes in power demand and adjust the state of the ECS to be ready to handle the change more effectively. For example, in one case, the ECS may communicate with a GPS and terrain map for the route being taken by the electric vehicle and recognize that a steep hill will soon be encountered. The ECS may anticipate the need to increase torque and thus the delivered electrical power from the ESU and thus activate additional power packs if only some are in use or otherwise increase the draw from the power packs to handle the change in slope efficiently to achieve desired objectives such as maintaining speed, reducing the need to shift gears on a hill, or reducing the risk of stalling or other problems.

The ECS may also comprise a communication module and an associated configuration system to properly configure the ECS to communicate with the interface or other aspects of the vehicle and communicate with central systems or other vehicles when desired. In such cases, a fleet of vehicles may be effectively monitored and managed to improve energy efficiency and track the performance of vehicles and their ESUs, thereby providing information that may assist with maintenance protocols. Such communication may occur wirelessly or through the cloud via a network interface, share information with various central databases, or access information from databases to assist with the vehicle's operation and the optimization of the ESU, for which historical data may be available in a database.

Databases of use with the ECS include databases on the charge and discharge behavior of the energy sources in the ESU to optimize both charging and discharging in use based on known characteristics, databases of topographical and other information for a route to be taken by the electric vehicle or an operation to be performed by another device employing the ESU, wherein the database provides guidance on what power demands are to be expected in advance to support anticipatory power management wherein the status of energy sources. The available charge is prepared in time to deliver the needed power proactively. Charging databases may also help describe the characteristics of an external power source used to charge the ESU.

Knowledge of the external charge characteristics can prepare for impedance matching or other measures needed to handle a new input source to charge the ESU. With that data, the external power can be received with reduced losses and reduced risk of damaging elements in the ESU by overcharge, an excessive ripple in the current, etc.

Beyond relying on static information in databases, in some aspects, the controller is adapted to perform machine learning and to learn from situations faced constantly. In related aspects, the processor and the associated software form a "smart" controller based on machine learning or artificial intelligence adapted to handle a wide range of input and a wide range of operational demands.

ESU Hardware
Charging and Discharging Hardware

The charging and discharging hardware comprises the wiring, switches, charge detection circuits, current detection circuits, and other devices for proper control of charge applied to the power packs or the batteries or other energy storage units and temperature-control devices such as active cooling equipment and other safety devices. Active cooling devices (not shown) may include fans, circulating heat transfer fluids that pass through tubing or, in some cases, surround or immerse the power packs, thermoelectric cooling such as Peltier effect coolers, etc.

To charge and discharge an individual unit among the power packs to optimize the overall efficiency of the ESU, methods are needed to select one or more of many units from what may be a three-dimensional or two-dimensional array of connectors to the individual units. Any suitable methods and devices may be used for such operations, including crosspoint switches or other matrix switching tools. Crosspoint switches and matrix switches are means of selectively connecting specific lines among many possibilities, such as an array of X lines (X1, X2, X3, etc.) and an array of Y lines (Y1, Y2, Y3, etc.) that may respectively have access to the negative or positive electrodes or terminals of the individual units among the power packs as well as the batteries or other energy storage units. SPST (Single-Pole Single-Throw) relays, for example, may be used. By applying a charge to individual supercapacitors within power packs or to individual power packs within the ESU, a charge can be applied directly to where it is needed, and a supercapacitor or power pack can be charged to an optimum level independently of other power packs or supercapacitors.

Configuration Hardware

The configuration hardware comprises the switches, wiring, and other devices to transform the electrical configuration of the power packs between series and parallel configurations, such as that a matrix of power packs may be configured to be in series, in parallel, or some combination thereof. For example, a 12×6 array of power packs may have four groups in series, with each group having 3×6 power packs in parallel. A command can modify the configuration from the configuration module, which then causes the configuration hardware to make the change at an appropriate time (e.g., when the device is not in use).

Sensors

The sensors may include thermocouples, thermistors, or other devices associated with temperature measurement such as IR cameras, etc., as well as strain gauges, pressure gauges, load cells, accelerometers, inclinometers, velocimeters, chemical sensors, photoelectric cells, cameras, etc., that can measure the status of the power packs or batteries or other energy storage units or other characteristics of the ESU or the device as described more fully hereafter. The sensors may comprise sensors physically contained in or on the ESU or sensors mounted elsewhere, such as engine gauges in electronic communication with the ECS or its associated ESC.

Batteries and Other Energy Sources

The ESU may be capable of charging or supplementing the power provided from the batteries or other energy storage units, including chemical and nonchemical batteries, such as but not limited to lithium batteries (including those with titanate, cobalt oxide, iron phosphate, iron disulfide, carbon monofluoride, manganese dioxide or oxide, nickel cobalt aluminum oxides, nickel manganese cobalt oxide, etc.), lead-acid batteries, alkaline or rechargeable alkaline batteries, nickel-cadmium batteries, nickel-zinc batteries, nickel-iron batteries, nickel-hydrogen batteries, nickel-metal-hydride batteries, zinc-carbon batteries, mercury cell batteries, silver oxide batteries, sodium-sulfur batteries, redox flow batteries, supercapacitor batteries, and combinations or hybrids thereof.

Power Input/Output Interface

The ESU also comprises or is associated with a power input/output interface that can receive charge from a device (or a plurality of devices in some cases) such as the grid or regenerative power sources in an electric vehicle (not shown) and can deliver charge to a device such as an electric vehicle (not shown). The power input/output interface may comprise one of more inverters, charge converters, or other circuits and devices to convert the current to the proper type (e.g., AC or DC) and voltage or amperage for either supplying power to or receiving power from the device it is connected to. Bidirectional DC-DC converters may also be applied.

The power input/output interface may be adapted to receive power from various power sources, such as via two-phase or three-phase power, DC power, etc. It may receive or provide power by wires, inductively, or other proper means. Converters, transformers, rectifiers, and the like may be employed as needed. The power received may be relatively steady from the grid, or other sources at voltages such as 110V, 120V, 220V, 240V, etc., or from highly variable sources such as solar or wind power amperage or voltage vary. DC sources may be, by way of example, from 1V to 0V or higher, such as from 4V to 200V, 5V to 120V, 6V to V, 2V to 50V. 3V to 24V, or nominal voltages of about 4, 6, 12, 18, 24, 30, or 48 V. Similar ranges may apply to AC sources, but also including from 60V to 300V, from 90V to 250V, from V to 240 V, etc., operating at any proper frequency such as 50 Hz, 60 Hz, Hz, etc.

Power received or delivered may be modulated, converted, smoothed, rectified, or transformed in any useful way to meet better the application's needs and the requirements of the device and the ESU. For example, pulse-width modulation (PWM), sometimes called pulse-duration modulation (PDM), may be used to reduce the average power delivered by an electrical signal as it is effectively chopped into discrete parts. Likewise, maximum power point tracking (MPPT) may be employed to keep the load at the right level for the most efficient power transfer.

The power input/out interface may have a plurality of receptacles of receiving power and a plurality of outlets for providing power to one or more devices. Conventional AC outlets may include any known outlet standard in North America, various parts of Europe, China, Hong Kong, etc.

Energy Control System (ECS)

The energy storage unit (ESU) is governed or controlled by a novel energy control system (ECS) adapted to optimize at least one of charging, discharging, temperature management, safety, security, maintenance, and anticipatory power delivery. The ECS may communicate with a user interface such as a display interface to assist in control or monitoring of the ESU and also may comprise a processor and a memory. The EC'S may interact with the ESU's hardware, such as the charging discharging hardware and a temperature control system that provides data to the ECS and responds to directions from the ECS to manage the ESU.

The energy control system (EC'S) may comprise a processor, a memory, one or more energy source modules, a charge/discharge module, a communication module, a configuration module, a dynamic module, an identifier module, a security module, a safety module, a maintenance module, and a performance module.

ECS Components and Modules

Processor

The processor may comprise one or more microchips or other systems for executing electronic instructions and can provide instructions to regulate the charging and discharging hardware and, when applicable, the configuration hardware or other aspects of the ESU and other aspects of the ECS and its interactions with the device, the cloud, etc. In some cases, a plurality of processors may collaborate, including processors installed with the ESU and processors installed in a vehicle or other device.

Memory

The memory may comprise coding to operate one or more of the ECS and their interactions with other components. It may also comprise information such as databases on any aspect of the operation of the ECS, though additional databases are also available via the cloud. Such databases can include a charging database that describes the charging and discharging characteristics of a plurality or all energy sources (the power packs and the batteries or other energy storage units) to guide charging and discharging operations. Such data may also be included with energy-source-specific data provided by or accessed by the energy source modules.

The memory may be in one or more locations or components such as a memory chip, a hard drive, a cloud-based source, or another computer-readable medium, and maybe in any application form such as flash memory, EPROM, EEPROM, PROM, MROM, etc., of combinations thereof and consolidated (centralized) or distributed forms. The memory may, in whole or part, be a read-only memory (ROM) or random-access memory (RAM), including static RAM (SRAM), dynamic RAM (DRAM), synchronous dynamic RAM (SDRAM), and magneto-resistive RAM (MRAM), etc.

Cloud Resources

The ECS may communicate with other entities via the cloud or other means. Such communication may involve information received from and provided to one or more databases and a message center. The message center can provide alerts to an administrator responsible for the ESU and the electric vehicle or another device. For example, an entity may own a fleet of electric vehicles using ESUs and may wish to receive notifications regarding usage, performance, maintenance issues, and so forth. The message center may also authenticate the ESU or verify its authorization for use in the electric vehicle or other devices (not shown) via interaction with the security module.

Energy Source Modules

The energy source modules may comprise specific modules designed to operate a specific energy source, such as a supercapacitor module, a lithium battery module, a lead-acid battery module, or other modules. Such modules may be associated with a database of performance characteristics (e.g., charge and discharge curves, safety restrictions regarding overcharge, temperature, etc.) that may provide information for use by the safety module and the charge/discharge module, which is used to optimize how each unit within the power packs or batteries or other energy storage units is used both in terms of charging and delivering charge.

The charge/discharge module seeks to provide useful work from as much of the charge as possible in the individual power packs while ensuring that individual power packs are fully charged but not damaged by overcharging. The charge/discharge module can assist in directing the charging discharging hardware, cooperating with the energy source modules. In one aspect, the ESU thus may provide real-time charging and discharging of the plurality of power packs while the electric vehicle is continuously accelerating and decelerating along a path.

Charge Discharge Module

The charge discharge module is used to optimize how each unit within the power packs, batteries, or other energy storage units is used to charge and deliver charge. The charge/discharge module seeks to provide useful work from as much of the charge as possible in the individual power packs while ensuring during charging that individual power packs are fully charged but not damaged by overcharging. The charge/discharge module can assist in directing the charging discharging hardware, cooperating with the energy source modules. In one aspect, the ESU thus may provide real-time charging and discharging of the plurality of power packs while the electric vehicle is continuously accelerating and decelerating along a path.

The charge/discharge module may be configured to charge or discharge each of the plurality of power packs up to a threshold limit. The charge/discharge module may be coupled to the performance, energy storage, and identifier modules. It may communicate with the charging discharging hardware of the ESU. For example, the threshold limit may be more than 90 percent capacity of each of the plurality of power packs in one aspect.

Dynamic Module

The dynamic module assists in coping with changes in operation, including acceleration, deceleration, stops, changes in slops (uphill or downhill), changes in traction or properties of the road or ground that affect traction and performance, etc., by optimizing the delivery of power or the charging that is taking place for individual power packs or batteries or other energy storage units. In addition to guiding the degree of power provided by or to individual power packs based on the current use of the device and the individual state of the power packs, in some aspects, the dynamic module provides anticipatory management of the ESU by proactively adjusting the charging or discharging states of the power packs such that added power is available as the need arises or slightly in advance (depending on time constants for the ESU and its components, anticipatory changes in status may only be needed for a few seconds (e.g. 5 seconds or less or 2 seconds or less) or perhaps only for 1 second or less such as for 0.5 seconds or less. Still, more extended preparatory changes may be needed in other cases, such as from 3 seconds to 10 seconds, to ensure that adequate power is available when needed but that power is not wasted by changing the power delivery state prematurely. This anticipatory control can involve increasing the current or voltage being delivered. Still, it can also involve increasing the cooling provided by the cooling hardware of the charging and discharging hardware in cooperation with the safety module and when suitable with the charge discharge module.

The dynamic module may be communicatively coupled to the charge/discharge module. The dynamic module may be configured to determine the charging and discharging status of the plurality of power packs and batteries or other energy storage units in real-time. For example, in one aspect, the dynamic module may help govern bidirectional charge discharge in real-time. The electric charge may flow from the ESU into the plurality of power packs and batteries or other energy storage units or vice versa.

Configuration Module

The ECS may comprise a configuration module configured to determine any change in the configuration of charged power packs from the charging module. For example, in one aspect, the configuration module may be provided to charge the configuration of the power packs, such as from series to parallel or vice versa. This may occur via communication with the charging/discharging hardware of the ESU.

Identifier Module

The identifier module, described in more detail hereafter, identifies the charging or discharging requirement for each power pack to assist in best meeting the power supply needs of the device. This process may require access to the database information about the individual power packs from the energy source modules (e.g., a supercapacitor module) and information about the current state of the individual power packs provided by the sensors and charge and current detections circuits associated with the charging and discharging hardware, cooperating with the charge discharge module and, as needed, with the dynamic module and the safety module.

Safety Module

The sensors may communicate with the safety module to determine if the power packs and individual components show excessive local or system temperature signs that might harm the components. In such cases, the safety module interacts with the processor and other features (e.g., data stored in the databases of the cloud or memory pertaining to safe temperature characteristics for the ESU) to cause a change in operation such as decreasing the charging or discharging underway with the portions of the power packs or other units facing excessive temperature. The safety module may also regulate cooling systems that are part of the charging and discharging hardware to proactively increase the cooling of the power packs, batteries, or other energy storage units. Increasing the load on them does not lead to harmful temperature increases.

Thus, the safety module may also interact with the dynamic module in responding to forecasts of system demands in the near future for anticipatory control of the ESU for optimized power delivery. In the interaction with the dynamic module, the safety module may determine that an upcoming episode of high system demand such as imminent climbing of a hill may impose excessive demands on a power pack already operating at elevated temperature, and thus make a proactive recommendation to increase cooling on the at-risk power packs. Other sensors such as strain gauges, pressure gauges, chemical sensors, etc., may be provided to determine if any of the energy storage units in batteries or other energy storage units or the power packs are facing pressure buildup from outgassing, decomposition, corrosion, electrical shorts, unwanted chemical reactions such as an incipient runaway reaction, or other system difficulties. In such cases, the safety module may initiate precautionary or emergency procedures such as a shutdown, electrical isolation of the affected components, warnings to a system administrator via the communication module to the message center, a request for maintenance to the maintenance module.

Maintenance Module

The maintenance module determines when the ESU requires maintenance, either per a predetermined scheduled or when needed due to apparent problems in performance, as may be flagged by the performance module, or in issues about safety as determined by the safety module based on data from sensors or the charging/discharging hardware, and in light of information from the energy sources modules. The maintenance module may cooperate with the communication module to provide relevant information to the display interface and the message center. An administrator or owner may initiate maintenance action in response to the message provided. The maintenance module may also initiate mitigating actions to be taken, such as cooperating with the charge discharge module to decrease the demand on one or more of the power packs in need of maintenance and may also cooperate with the configuration module to reconfigure the power packs to reduce the demand in components that may be malfunctioning of near to malfunctioning to reduce harm and risk.

Performance Module

The performance module continually monitors the results obtained with individual power packs and the batteries or other energy storage units and stores information as needed in memory and the cloud databases or via messages to the message center. The monitoring is done by using the sensors and the charging/discharging hardware, etc. The tracking of performance attributes of the respective energy sources can guide knowledge about the system's health, the capabilities of the components, etc., which can guide decisions about charging and discharging in cooperation with the charge discharge module. The performance module compares actual performance, such as power density, charge density, time to charge, thermal behavior, etc., to specifications and can then cooperate with the maintenance module to help determine if maintenance or replacement is needed, and alert an administrator via the communication module with a message to the message center about apparent problems in product quality.

Security Module: Security and Anti-Counterfeiting Measures

The security module helps reduce the risk of counterfeit products or theft or misuse of legitimate products associated with the ESU, thus including one or more methods for authenticating the nature of the ESU and authorization to use it with the device in question. Methods of reducing the risk of theft or unauthorized use of an ESU or its respective power packs can include locks integrated with the casing of the ESU that mechanically secure the ESU in the electric vehicle or other devices, wherein a key, a unique fob, a biometric signal such as a fingerprint or voice recognition system, or other security-related credentials or may be required to enable removal of the ESU or even operation thereof.

In another aspect, the ESU comprises a unique identifier (not shown) that can be tracked, allowing a security system to verify that a given ESU is authorized for use with the device, such as an electric vehicle or other devices. For example, the casing of the ESU or one or more power packs therein may have a unique identifier attached, such as an RFID tag with a serial number (an active or passive tag), a holographic tag with unique characteristics equivalent to a serial number or password, nanoparticle markings that convey a unique signal, etc. One good security tool that may be adapted for the security of the ESU is a seemingly ordinary bar code or QR code with unique characteristics not visible to the human eye that cannot be readily copied, is the Unisecure™ technology offered by Systech (Princeton, NJ), a subsidiary of Markem-Image, that essentially allows ordinary QR codes and barcodes to become unique, individual codes by analysis of tiny imperfections in the printing to uniquely and robustly identify every individual product, even if it seems that the same code is printed on every one.

Yet another approach relies at least in part on the unique electronic signature of the ESU and one or more individual power packs or of one or more supercapacitor units therein. The principle will be described relative to an individual power pack but may be adapted to an individual supercapacitor or collectively to the ESU as a whole. When a power pack comprising supercapacitors is charged from a low voltage or relatively discharged state, the electronic response to a given applied voltage depends on many parameters, including microscopic details of the electrode structure such as porosity, pore size distribution, and distribution of coating materials, or details of electrolyte properties, supercapacitor geometry, etc., as well as macroscopic properties such as temperature. At a specified temperature or temperature range and under other suitable macroscopic conditions (e.g., low vibration, etc.), the characteristics of the power pack may then be tested using any suitable tool capable of identifying a signature specific to the individual power pack.

Communication Module

The communication module can govern communications between the ECS and the outside world, including communications through the cloud, such as making queries and receiving data from various external databases or sending messages to a message center where they may be processed and archived by an administrator, a device owner, the device user, the ESU owner, or automated systems. In some aspects, the communication module may also oversee communication between modules or between the ESU and the ECS and work in cooperation with various modules to direct information to and from the display interface. Communications within a vehicle or between the ECS or ESU and the device may involve a DC bus or other means such as separate wiring. Any suitable protocol may be used, including UART, LIN (or DC-LIN), CAN, SPI, I2C (including Intel's SMBus), and DMX (e.g., DMX512). In general, communications from the ECS or ESU with a device may be over a DC bus or, if needed, over an AC/DC bus, or by separately wired pathways if desired, or wireless.

Communication to the cloud may occur via the communication module and involve wired or wireless connections. If wireless, various communication techniques may be employed such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques.

Electrostatic Module

Assessment of charge in an energy storage unit can be conducted based on measurements made with the charging/discharging hardware in communication with specific modules of the ECS. In general, an electrostatic module can manage the measurement of charge and processing of the data.

The electrostatic module may be configured to identify the power pack type and the capacity of each power pack connected to the modular multi-type power pack energy storage unit. Further, the electrostatic module may be configured to retrieve information related to the type of power packs from the charging database. The electrostatic module may determine the capacity of each power pack to be charged. It may be configured to determine the capacity of each power pack when connected to the modular multi-type power pack ESU.

The electrostatic module may be configured to determine if each power pack charged below the threshold limit. For example, in one aspect, the electrostatic module may check whether each of the plurality of power packs may have a capacity below the threshold limit. The electrostatic module may also be configured to send data related to power packs to the ECS.

Various Databases

The ECS may access various databases via an interface to the cloud and store retrieved information in the memory to guide the various modules.

Further, the memory may comprise a charging database or information from such a database obtained from the databases or the cloud. In one aspect, the charging database may be configured to store information related to various power packs used while charging and discharging from the ESU. In one aspect, the charging database may be configured to store information related to the power cycle of each of the plurality of power packs, the maximum and minimum charge for different types of power packs, and the state of charge (SoC) profile of each of the plurality of power packs.

The charging database may be configured to store information related to managing the plurality of power packs, such as the type of power pack to be charged, safety specifications, recent performance data, bidirectional charging requirements, or history of each of the plurality of power packs, etc. In another aspect, the stored information may also include, but is not limited to, the capacity of each of the plurality of power packs, amount of charge required for one trip of the electric vehicle along the path, such as golf course, etc., charging required for a supercapacitor unit, etc. In another aspect, the charging database may provide a detailed research report for the electric vehicle's average electric charge consumption over a path. In one aspect, the charging database may be configured to store information of the consumption of the electric charge per unit per kilometer drive of the electric vehicle from the plurality of power packs. For example, such information may indicate that a golf cart is equipped with five supercapacitor-driven power packs each at 90% charge, with each power packable to supply a specified amount of ampere-hours (Ah) of electric charge resulting in an ability to drive under normal conditions at top speed for, say, 80 kilometers. The information may also indicate that a solar cell installed on the roof of the golf cart would, under current partly clouded conditions, still provide enough additional charge over the planned period of use to extend the capacity of the ESU by another 40 kilometers for one passenger.

The performance module may use the charging database to read data and store new data on the individual energy storage units such as the power packs.

Power Pack

A power pack is a unit that can store and deliver charge within an energy storage unit and comprises one or more supercapacitors such as supercapacitors in series and parallel. It may further comprise or cooperate with temperature sensors, charge and current sensors (circuits or other devices), connectors, switches such as crosspoint switches, safety devices, and control systems such as charge and discharge control systems. In various aspects described herein, the power pack may comprise a plurality of supercapacitors and have an energy density greater than 200 kWhr/kg, 230 kWhr/kg, 260 kWhr/kg, or 300 kWhr/kg, such as from 200 to 500 kWhr/kg, or from 250 to 500 kWhr/kg. The power pack may have a functional temperature range from $-70°$ C. to $+°$ C., such as from $-50°$ C. to $°$ C. or from $-40°$ C. to $80°$ C. The voltage provided by the power pack may be any practical value such as 3V or more significant, such as from 3V to 240 V, 4V to 120 V, etc.

By way of example, a power pack may comprise one or more units, each comprising at least one supercapacitor having a nominal voltage from 2 to 12 V, such as from 3 to 6 V, including supercapacitors rated at about 3, 3.5, 4, 4.2, 4.5, and 5 V. For example, in discharge testing, a power pack was provided and tested with 14 capacitors in series and five series in parallel charged with 21,000 F at 4.2 V and had 68-75 Wh. Power packs may be packaged in protective casings that can easily be removed from an ESU and replaced. They may also comprise connectors for charging and discharging. Power packs may be provided with generally rectilinear casings, or they may have cylindrical or other useful shapes.

Supercapacitor Information

Supercapacitors

A supercapacitor may have two electrode layers separated by an electrode separator wherein each electrode layer is electrically connected to a current collector supported upon an inert substrate layer; further comprising an electrolyte-impervious layer disposed between each electrode layer and each conducting layer to protect the conducting layer, and a liquid electrolyte disposed within the area occupied by the active electrode layers and the electrode separator. To inhibit electrolyte flow, the liquid electrolyte may be an ionic liquid electrolyte gelled by a silica gellant or other gellant.

The supercapacitor may comprise an electrode plate, an isolation film, a pole, and a shell. The electrode plate comprises a current collector, and a coating is disposed of on the current collector. The coating may comprise an active material that may include carbon nanomaterial such as graphene or carbon nanotubes, including nitrogen-doped graphene, a carbon nitride, carbon materials doped with a sulfur compound such as thiophene or poly 3-hexylthiophene, etc., or graphene on which is deposited nanoparticles of metal oxide such as manganese dioxide. The coating may further comprise a conductive polymer such as one or more polyaniline, polythiophene, and polypyrrole. Such polymers may be doped with various substances such as boron (especially in the case of polyaniline).

Electrodes in supercapacitors may have thin coatings in electrical communication with a current collector, to provide high electrode surface area for high performance, electrodes may comprise porous material with a high specific surface area such as graphene, graphene oxide, or various derivatives of graphene, carbon nanotubes or other carbon nanomaterials including activated carbon, nitrogen-doped graphene or another doped graphene, graphite, carbon fiber-cloth, carbide-derived carbon, carbon aerogel. They may comprise various metal oxides such as oxides of manganese, etc. All such materials may be provided in multiple layers and generally planar, cylindrical, or other geometries. Electrolytes in the supercapacitor may include semi-solid or gel electrolytes, conductive polymers or gels thereof, ionic liquids, aqueous electrolytes, and the like. Solid-state supercapacitors may be used.

Supercapacitors may be provided with various indicators and sensors about charge state, temperature, and other performance and safety aspects. An actuation mechanism may be integrated to prevent undesired discharge.

The voltage of an individual supercapacitor may be greater than 2 V, such as from 2.5 V to 5 V, 2.7 V to 8 V, 2.5 V to 4.5 V, etc.

Supercapacitors can be divided into units of smaller supercapacitors. In one embodiment, a "constant voltage unit" of five units can be joined together in parallel to maintain the voltage bat supply five times more current. In another embodiment, a "constant current unity" can include five units joined together in series to multiply the unit voltage by five times but maintain the current. In another embodiment, supercapacitors can provide hybrid "constant voltage units" and "constant current units." In yet another embodiment, supercapacitors units can be connected in any number of combinations to end up with a supercapacitor of optimum design. In another embodiment, each supercapacitor unit can comprise various subunits or pouches. Supercapacitor subunits can be combined for a super capacitor using constant current sub units or constant voltage sub units, or any combination. In yet another embodiment, supercapacitor units or sub-units can comprise size or form factors. In yet another embodiment, each subunit and unit can be uniquely addressed to turn on or off the super capacitor unit or sub-unit on or off. This is achieved with any variety of crossbar switches. A crossbar switch is an assembly of individual switches between inputs and a set of outputs. The switches are arranged in a matrix. If the crossbar switch has M inputs and N outputs, then a crossbar has a matrix with M/N cross-points or places where the connections cross. At each crosspoint is a switch; when closed, it connects one of the inputs to one of the outputs. A given crossbar is a single layer, non-blocking switch. A non-blocking switch means that other concurrent connections do not prevent connecting other inputs to other outputs. Collections of crossbars can be used to implement multiple layers and blocking switches. A crossbar switching system is also called a coordinate switching system. In this way, a crossbar switch can select any combinations of pouches or subunits and units to obtain any combination. The crossbar switches can be used for testing units or subunits and optimizing supercapacitor performance.

Powered Devices and Electric Vehicles, Etc.

Powered devices powered by the ESU can include electric vehicles and other transportation devices of all kinds, such as those for land, water, or air, whether adapted to operate without passengers or with one or more passengers. Electric vehicles may include automobiles, trucks, vans, forklifts, carts such as golf carts or baby carts, motorcycles, electric bikes scooters, autonomous vehicles, mobile robotic devices, hoverboards, monowheels, Segways® and other personal transportation devices, wheelchairs, drones, personal aircraft for one or more passengers and other aeronautical devices, robotic devices, aquatic devices such as boats or personal watercraft such as boats, Jet Skis®, diver propulsion vehicles or underwater scooters, and the like, etc. The electric vehicle generally comprises one or more motors connected to the ESU and an energy control system (ECS) that controls the power delivered from the ESU and may comprise a user interface that provides information and control regarding the delivery of power from the ESU as well as information regarding performance, remaining charge, safety, maintenance, security, etc. Not all transportation devices require non-stationary motors. An elevator, for example, may have a substantially stationary motor while the cabin moves between the level of a structure. Other transport systems with mobile cabins, seats, or walkways may be driven by stationary motors driving cables, chains, gears, bands, etc.

Apart from electric vehicles, there are many other devices that the ESU may power in cooperation with the ESC. Such other devices can include generators, which in turn can power an endless list of electric devices in households and industry. ESUs of various sizes and shapes can also be integrated with a variety of motors, portable devices, wearable or implantable sensors, medical devices, acoustic devices such as speakers or noise cancellation devices, satellites, roboties, heating and cooling devices, lighting systems, rechargeable food processing tools and systems of all kinds, personal protection tools such as tasers, lighting and heating systems, power tools, computers, phones, tablets, electric games, etc. In some versions, the powered device is the grid, and in such versions, the ESU may comprise an inverter to turn DC into AC suitable for the grid.

In some aspects, a plurality of devices such as electric vehicles may be networked together via a cloud-based network, wherein the devices share information among themselves and with a central message center such that an administrator can assist in managing the allocation of resources, oversee maintenance, evaluate the performance of vehicles and ESUs, upgrade software or firmware associated with the ESC to enhance performance for the particular needs of individual users or a collective group, adjust operational settings to better cope with anticipated changes in weather, traffic conditions, etc., or otherwise optimize performance.

Implementation in Hybrid Vehicles

When installed in electric vehicles, the ESU may comprise both power packs and one or more lead-acid batteries or other batteries. The ESU may power both the motor and the onboard power supply system. The display interface of the associated ESC may comprise a graphical user interface such as the vehicle's control panel (e.g., a touch panel). The display interface may also comprise audio information and verbal input from a user.

Motors

The ESU may power any electric motor. The major classes of electric motors are: 1) DC motors, such as series, shunt, compound wound, separately excited (wherein the connection of stator and rotor is made using a different power supply for each), brushless, and PMDC (permanent magnet DC) motors, 2) AC motors such as synchronous, asynchronous, and induction motors (sometimes also called asynchronous motors), and 3) special purpose motors such as servo, stepper, linear induction, hysteresis, universal (a series-wound electric motor that can operate on AC and DC power), and reluctance motors.

Display Interface

The display interface of the ESC may be displayed on or in the device, such as on a touch screen or other display in a vehicle or on the device, or it may be displayed by a separate device such as the user's phone. The display interface may comprise or be part of a graphic user interface such as the vehicle's control panel (e.g., a touch panel). The display interface may also comprise audio information and verbal input from a user. It may also be displayed on the ESU itself or a surface connected to or communicated with the ESU. In one version, the display interface may include but is not limited to a video monitoring display, a smartphone, a tablet, and the like, each capable of displaying a variety of parameters and interactive controls. Still, the display could also be as simple as one or more lights indicating charging or discharging status and optionally one or more digital or analog indicators showing remaining useful lifetime, % power remaining, voltage, etc.

Further, the display interface may be any state-of-the-art display means without departing from the scope of the disclosure. In some aspects, the display interface provides graphical information on charge status, including one or more fractions of charge remaining or consumed, remaining useful life of the ESU or its components (e.g., how many miles of driving or hours of use are possible based on current or projected conditions or based on an estimate of the average conditions for the current trip or period of use), and may also provide one or more user controls to allow selection of settings. Such settings may include low, medium, or high values for efficiency, power, etc.; adjustment of operating voltage when feasible; safety settings (e.g., prepare the ESU for shipping, discharge the ESU, increase active cooling, only apply low power, etc.); planned conditions for use (e.g., outdoors, high-humidity, in the rain, underwater, indoors, etc.). Selections may be made through menus and buttons on a visual display, through audio "display" of information responsive to verbal commands, or through text commands or displays transmitted to a phone or computer, including text messages or visual display via an app or web page.

Thus, the ESU may comprise a display interface coupled to the processor to continuously display the status of charging and discharging the plurality of power packs.

General:

All patents and applications cited must be understood as being incorporated by reference to the degree they are compatible.

For all ranges given herein, it should be understood that any lower limit may be combined with any upper limit when feasible. Thus, for example, citing a temperature range of from 5° C. to ° C. and from 20° C. to 200° C. would also inherently include a range of from 5° C. to 200° C. and a range of 20° C. to ° C.

When listing various aspects of the products, methods, or system described herein, it should be understood that any feature, element, or limitation of one aspect, example, or claim may be combined with any other feature, element, or limitation of any other aspect when feasible (i.e., not contradictory). Thus, disclosing an example of a power pack comprising a temperature sensor and then a different example of a power pack associated with an accelerometer would inherently disclose a power pack comprising or associated with an accelerometer and a temperature sensor.

Unless otherwise indicated, components such as software modules or other modules may be combined into a single module or component or divided. The function involves the cooperation of two or more components or modules. Identifying an operation or feature as a single discrete entity should be understood to include division or combination such that the effect of the identified component is still achieved.

Some embodiments of this disclosure, illustrating its features, will now be discussed in detail. It can be understood that the embodiments are intended to be open-ended in that an item or items used in the embodiments is not meant to be an exhaustive listing of such items or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used to practice or test embodiments, only some exemplary systems and methods are now described.

FIG. 1 is a block diagram illustrating an architecture of an energy management system 100. The energy management system 100 may be part of a supercapacitor battery powered electronic vehicle. The energy management system 100 may comprise the electric vehicle 102. In one embodiment, the electric vehicle 102 may correspond to but is not limited to a golf cart, an electric car, and an electric bike. In one embodiment, the energy management system 100 may be referred to as a system for enhancing the capability of the electric vehicle 102 using ultra-capacitors or supercapacitors in series or parallel. Further, the energy management system 100 may provide a smart energy management system to supply electric charge to the vehicle motor of the electric vehicle 102 from supercapacitors in a controlled manner to maximize charge efficiency. Further, the energy management system 100 may provide ultra-capacitors with real-time charging and discharging while the electric vehicle 102 is continuously accelerating and decelerating along a predefined path. In one embodiment, the energy management system 100 may be referred to as a modular graphene supercapacitor power pack for powering the electric vehicle 102, in electric vehicle 102. Further, the energy management system 100 may comprise an energy management database 104 communicatively coupled to the electric vehicle 102 via a cloud 106 or directly to the processor (not shown).

In one embodiment, the energy management database 104 may be configured to provide historical data related to the electric vehicle 102. In another embodiment, the energy management database 104 may provide a research report for an average charge consumption of the electric vehicle 102 over a predefined path. In one embodiment, the energy management database 104 may store information related to supercapacitor units, electric charge percentage, acceleration of motor, and electric charge in the supercapacitor units, as well as data for individual drivers, driving conditions (temperature, weather, time of year or day), power pack identity or characteristics, the mass of the vehicle and passengers and cargo (this may require load cells installed in the vehicle or an external device for weighing the vehicle), etc., in energy management database 104. Further, embodiments may include a cloud 106. It can be noted that cloud 106 may facilitate a communication link among the components of the energy management system 100. It can be noted that cloud 106 may be a wired and a wireless network. The cloud 106, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques, known in the art. In some embodiments, the cloud connection could be replaced by a "bus" to connect the processor to any other controller or memory unit (not shown) in cloud 106. Further, the energy management system 100 may comprise a plurality of supercapacitor units 108 disposed within the electric vehicle 102.

Unit 108 could be, for example, is a 21,000 F 4.2V nano-pouch graphene energy module with a final 48V 100 AH Graphene Power Pack. The 21,000 F 4.2V nano-pouch graphene energy modules may contain many layers of a graphene lattice matrix structure deposited using a unique method of electropolymerization that provides a highly dense energy storage module design with high-current energy transfer. Due to the tightly coupled nanotechnology design and manufacturing methods, energy storage and delivery can be cycled thousands of times without matrix degradation. This power pack is a capacitive battery substitute in nature, graphene-based, and contains no lithium or other chemical conversion components. In one embodiment, the plurality of supercapacitor units 108 may be continuously charged in realtime, depending upon the usage of the electric vehicle 102, such as through the use of solar panels, inductive charging, etc., and optionally by redistributing charge among individual supercapacitors or supercapacitor units (a single supercapacitor unit 108 may comprise multiple supercapacitors internally). Alternatively or in addition, supercapacitor units 108 may be charged while connected to a suitable charging source such as an AC power line (not shown) or DC power (not shown) n alternative energy source such as solar power, wind power, etc., where a trickle charging system may be applied, in supercapacitor units 108.

Further, the plurality of supercapacitor units 108 may comprise an input port 110 and an output port 112. Further, the input port 110 may be provided to charge the plurality of supercapacitor units 108. The output port 112 may be provided to connect the plurality of supercapacitor units 108 to the electric vehicle 102 or any other device. Input port 110 and output port 112 may be used for testing the supercapacitor unit 108 (not shown) in input port 110. In one embodiment, the output port 112 may be provided with a connector to connect the plurality of supercapacitor units 108 to the electric vehicle 102. In one embodiment, each of the plurality of supercapacitor units 108 may comprise a plurality of power pack units coupled to each other in series or parallel.

In one embodiment, the plurality of supercapacitor units 108 may enhance the performance of the electric vehicle 102 by supplying the electric charge according to the desired need of the electric vehicle 102, in output port 112. Further, the charging and discharging of each of the plurality of supercapacitor units 108 may be displayed over a display interface 114 (not shown). In one embodiment, the display interface 114 may be integrated within the electric vehicle 102. The display interface 114 may be, but is not limited to, a video monitoring display, a smartphone, and a tablet, each capable of displaying a variety of parameters and interactive controls, but could also be as simple as one or more lights indicating charging or discharging status and optionally one or more digital or analog indicators showing remaining useful lifetime, % power remaining, voltage, etc. It should be noted that instructions related to managing the plurality of supercapacitor units 108 may be stored in the energy management database 104.

Further, a user may retrieve the store instructions from the energy management database 104 before driving the electric vehicle 102. In one embodiment, the stored instructions may include but are not limited to the capacity of each of the plurality of supercapacitor units 108, amount of charge required for one trip of electric vehicle 102 along the path, such as golf course, etc., charging required for a supercapacitor unit, and acceleration and deceleration data related to the path of the electric vehicle 102. The energy management database 104 need not comprise details about the route and its characteristics. Still, it may interact with a GPS, terrain database, or other sources of information (not shown) to enable the needed computations in display interface 114. Further, the energy management system 100 may be operatively associated with a processor 116, a memory unit 118, and a design database 120. In one embodiment, the processor 116 may be comprised within the electric vehicle 102 or integrated within the casing or other components of the energy management system 100 or may have components distributed in two or more locations.

Further, processor 116 may be configured to retrieve the electric vehicle 102, the plurality of supercapacitor units 108 from the energy management database 104, the terrain or route, and other parameters via the cloud 106 and other remote sources. In one embodiment, the retrieved information related to the electric vehicle 102 may be stored in real-time into the memory unit 118, an processor 116.

Farther, the memory unit 118 may be configured to retrieve information related to the performance of the electric vehicle 102 from the design database 120, in memory unit 118. In one embodiment, the design database 120 may be configured to store the consumption of electric charge per unit per kilometer drive of the electric vehicle 102. For example, an electric vehicle 102 with ten supercapacitor units installed consumes 5 kW/h of electric charge for one hour to drive the electric vehicle 1 for a distance of one kilometer at a characteristic speed of 7 m/s (about 16 mph) with an initial acceleration of, say, 23M/s2. Further, for an electric vehicle 2 with 15 supercapacitor units installed, it consumes 8 kW/h of electric charge for one hour to drive the electric vehicle 2 for a distance of one kilometer with an acceleration of 42 m/s2. Further, for an electric vehicle 3 with 13 supercapacitor units installed, it consumes 4 KW/h of electric charge for one hour to drive the electric vehicle 3 for a distance of one kilometer with an acceleration of 26 m/s2. Further, for an electric vehicle 4 with 12 supercapacitor units installed, it consumes 3 KW/h of electric charge for one hour to drive the electric vehicle 4 for a distance of one kilometer with an acceleration of 24 m/s2. Further, for an electric vehicle 5 with 20 supercapacitor units installed, it consumes 10 kW/h of electric charge for one hour to drive the electric vehicle 5 for a distance of one kilometer with an acceleration of 46 m/s2, in design database 120.

Further, the energy management system 100 may comprise a plurality of modules to evaluate and enhance the performance of the electric vehicle 102. In one embodiment, the energy management system 100 may comprise or be operatively associated with a base module 122 communicatively coupled to the processor 116. In another embodiment, base module 122 may reside in whole or in part in memory 118. In one embodiment, the base module 122 may act as a central module to receive and send instructions to/from each of the plurality of modules. In one embodiment, the base module 122 may be configured to manage at least two parameters related to the electric vehicle 102, such as, but are not limited to, electric charge of the plurality of supercapacitor units 108 and the performance of the electric vehicle 102 when the electric vehicle 102 receives a predefined amount of electric charge from the plurality of supercapacitor units 108, in base module 122.

Further, the base module 122 may comprise an energy optimization module 124 to optimize the electric charge of the plurality of supercapacitor units 108. In one embodiment, the energy optimization module 124 may be configured to determine the percentage of electric charge available in each of the plurality of supercapacitor units 108. In another embodiment, the energy optimization module 124 may be configured to collect data related to each of the plurality of supercapacitor units 108 required for one run time of the electric vehicle 102 along the predefined path. The Energy Optimization Module 124 is designed to rely on supercapacitors' premeasure performance, such as the charge curve over time and the discharge curve overtime at various loads. Once this premeasured performance is defined, it is stored in a database (not shown). The Energy Optimization Module 124 may also rely on other curves such as, but not related to voltage vs. current charge and discharge curves, temperature as a discharge function under various loads, humidity versus storage time as a particular voltage, etc. The Energy Optimization module may, for example, evaluate the future load prediction due to a user-defined map, where the energy optimization module 124 may determine that 5 out of 10 batteries would be sufficient for the prediction, so the energy optimization module 124 determinations may inform which batteries may be used for the predicted trip. The energy optimization module 124, using user capacitor premeasurements, may determine that even though 5 out of 10 batteries would be sufficient for the preplanned trip, that 7 of the ten supercapacitor batteries are used, leaving 7 of 10 batteries with usable future charge and 3 of the ten batteries left fully charges in case there is a deviation from the planned trip. The energy optimization module 124 could define used in preplanned route optimization or route optimization in many ways, including but not limited to Artificial Intelligence of historical data, historical data on actual use of a common route, etc. Since graphene-based supercapacitors have unique "signatures of performance" based upon pre measurements above that are different than, say, lead-acid batteries or lithium-ion batteries, the unique "signatures of performance" using the energy optimization module 124 will make the driving experience of the EV using the graphene-based supercapacitors to be a least the same if not better experience than if the EV used lead-acid batteries or lithium-ion batteries, that is, less likely to have battery failures, batteries lose power uphill, batteries run out when traveling, in energy optimization module 124.

Further, the base module 122 may comprise a charging module 126, configured to evaluate the charging requirement of each of the plurality of supercapacitor units 108. The charging module 126 is described in conjunction with FIG. 5. In one embodiment, the charging module 126 may be activated and deactivated automatically by the base module 122 upon receiving a request from the energy optimization module 124 related to the requirement of the electric charge to drive the electric vehicle 102. For example, if there are enough battery units with enough charge for running the EV at certain speeds for a certain amount of time (average power consumption), the charging module 126 is deactivated. If the EV at certain speeds for a certain time (average power consumption) is not available, the charging module 126 is activated. In one embodiment, the charging module 126 may be configured to retrieve data related to each of the plurality of supercapacitor units 108 from the energy management database 104. In one embodiment, the data related to each of the plurality of the supercapacitor units 108 may correspond to an amount of electric charge stored in each of the plurality of supercapacitor units 108. In another embodiment, the charging module 126 may be configured to analyze and compare the data retrieved from the energy management database 104 concerning the data related to each of the plurality of supercapacitor units 108. Further, the charging module 126 may determine whether charging is needed or not, in charging module 126.

Further, the base module 122 may comprise a maintenance module 128 to maintain the electric vehicle 102. In one embodiment, the maintenance module 128 may be configured to run internal maintenance of the electric vehicle 102 and the plurality of supercapacitor units 108 after the base module 122 receives a notification from the charging module 126. Further, the maintenance module 128 may determine whether the electric vehicle 102 is consuming the electric charge more than the desired charge for a particular run time, where a maintenance check may be needed. In one embodiment, the maintenance module 128 may raise a maintenance request to the base module 122, indicating that the plurality of supercapacitor units 108 is not coupled correctly. The electric vehicle 102 is experiencing more load while driving over the predefined path. Further, the maintenance module 128 may determine the performance of the electric vehicle 102 for retrieved performance from the design database 120 and the energy management database 104. In another embodiment, the maintenance module 128 may perform an internal maintenance check-up to determine whether each component of the electric vehicle 102 is functioning up to its desired requirement in maintenance module 128.

Further, the base module 122 may comprise a speed optimization module 130 configured to provide the predefined path of the electric vehicle 102. The speed optimization module 130 may also be referred to as a range optimization module in one embodiment. Further, the speed optimization module 130 may enhance the performance of the electric vehicle 102 by minimizing the consumption of electric charge. In one embodiment, the speed optimization module 130 may be configured to provide a road map for the electric vehicle 102. In one embodiment, the road map may be a graph or a curve with anticipated acceleration and deceleration points along the predefined path with areas where the drain is used and where it is not (hills drain batteries a lot and valleys drain the battery less). Therefore, the electric vehicle 102 may consume electric charge only when accelerating over a steep curve and may stop the flow of the electric charge while moving downwards on a steep curve. Further, the speed optimization module 130 may retrieve information related to maintenance of the electric vehicle 102 from the design database 120 to measure the amount of electric charge consumed by the electric vehicle 102 before maintenance in speed optimization module 130.

Further, the base module 122 may comprise a control module 132 configured to determine the best use of the electric charge from the plurality of supercapacitor units 108. In one embodiment, the controller module 132 may be configured to retrieve information related to the ideal consumption of the electric charge of the electric vehicle 102 from the energy management database 104. Further, the controller module 132 may use information from the energy optimization module 124, the charging module 126, the maintenance module 128, and the speed optimization module 130 to determine the best use of the electric charge. For example, the controller module 132 retrieves from the energy management database 104 that the electric vehicle 102 should consume 3 kWh per kilometer of electric charge. However, the maintenance module 128 and the speed optimization module 130 provide information that the electric vehicle 102 is consuming 4 kWh per kilometer of electric charge. Therefore, the controller module 132, using the anticipated acceleration and deceleration map, can determine the best use of the electric charge to manage overall watt-hour energy over time. Further, the controller module 132 may be configured to effectively manage the plurality of supercapacitor units 108 in series or parallel in controller module 132.

In one embodiment, the base module 122 may comprise a communication module 134 configured to facilitate communication between the base module 122 and the plurality of supercapacitor units 108. Further, the base module 122 may determine the number of supercapacitor units being used in the electric vehicle 102 in real-time. In one embodiment, the communication module 134 may be configured to provide an exact figure for connections of the supercapacitor units 108 for the plurality of supercapacitor units 108, which continuously supply electric charge to the electric vehicle 102. Further, the base module 122 may comprise a health and safety module 136 and a security module 138. The health and safety module 136 may be configured to provide health and safety-related to the user related to the safety of the battery (danger of fire or explosion) of the electric vehicle 102. For example, 102 experiences health-related problems while driving the electric vehicle, such as batteries getting near and an over-temperature setting, which can be displayed using the display interface 114. Further, the electric vehicle 102 may be provided with the security module 138 to measure continuously the plurality of supercapacitor units 108 installed within the electric vehicle 102. The security module 138 may also evaluate and warn users how external charging hookups may be configured. Communications module 134 covers internal messaging and control data internally to the system 100 and messaging to the user using the display interface 114, in communications module 134. Further, the base module 122 may comprise a health and safety module 136. The health and safety module 136 may be configured to provide health and safety-related to the user related to the safety of the battery (danger of fire or explosion) of the electric vehicle 102, in health and safety module 136. Further, the electric vehicle 102 may be provided with the security module 138 to measure continuously the plurality of supercapacitor units 108 installed within the electric vehicle 102. The security module 138 may also evaluate and warn users how external charging hookups may be configured in security module 138. Further, the base module 122 may comprise a motor control module 140 to enhance the performance of the vehicle motor of the electric vehicle 102. In one embodiment, the motor control module 140 may be configured to evaluate the performance of the vehicle motor in at least two modes. The two modes may be enhanced torque and economy modes in one embodiment. Further, the enhanced torque mode may be employed when the electric vehicle 102 moves up a bill or the steep curve of the road upwards. In one embodiment, the motor consumes more electric charge to generate more torque for moving the electric vehicle 102 upwards. Further, the economy mode may be initiated when the electric vehicle 102 moves down the hill. The less electric charge needs to drive the electric vehicle 102 downwards or when the electric vehicle 102 is extending beyond the run time. In one embodiment, the motor control module 140 may be configured to monitor and anticipate the performance of the motor according to the enhanced torque mode or the economy mode. Further, the motor control module 140 may retrieve data related to parameters affecting the movement of the electric vehicle 102 over the path from the energy management database 104 and the design database 120. In one embodiment, the data may include but is not limited to weather, length of the day, length of a golf course, a motor control module 140. Design database 120 also stores all the data in real-time by any data created in Base Module 122, at design database 120. Thermal Base Module 142 executes from Base Module 122 inputs all Thermal History Database and from Thermal Realtime Database 152 and then executes Thermal Read Module 154 and Thermal Matching Module 156, at Thermal Base Module 142. Pouch batteries 1-N 144 are supercapacitor batteries manufactured in pouch form, at pouch batteries 144. Pouch thermal sensors 1-N 146 are sensors attached to each pouch that measures temperature such as (1) a thermostat is a contact type temperature sensor consisting of a bi-metallic strip made up of two dissimilar metals such as aluminum, copper, nickel, or tungsten or (2) Resistive Temperature Detectors (RTD) which are precise temperature sensors that are made up of high-purity conducting metals such as platinum, copper or nickel wound into a coil. The electrical resistance of an RTD changes similar to that of a thermistor or (3) Thermocouples or others, at pouch thermal sensors 146. A pouch battery management system is an electronic system that manages a rechargeable battery (cell or battery pack), such as by protecting the battery from operating outside its safe operating area[clarification needed], monitoring its state, calculating secondary data, reporting that data, controlling its environment, authenticating it and balancing it. The Pouch battery management system manages which pouches are connected to the system. The Pouch battery management system also reads the temperature of the pouch batteries 1-n 144 in real-time, at Pouch MGMT System 148. The Thermal History database 150 has all the historical temperature to pouch battery data and all the past rules, patterns, or AI findings used by the Thermal Match module 156, at Thermal History database 150. The thermal real-time database 152 stores all the data from the thermal read module 154 and Thermal matching module 156. Thermal Read Module 154 initiates Pouch MGMT System 148 to read all sensor data of each Pouch Thermal Sensors 1-N 146 for each of Pouch Batteries 1-N 144, at Thermal Read Module 154. Thermal Matching Module 156 inputs all Thermal Historical Database 150 data and data from Thermal RealTime Database 150 and determines if there is a real-time rule or pattern or AI match of the pouch thermal sensor to the historical data, at Thermal matching module 156.

Figure 2:
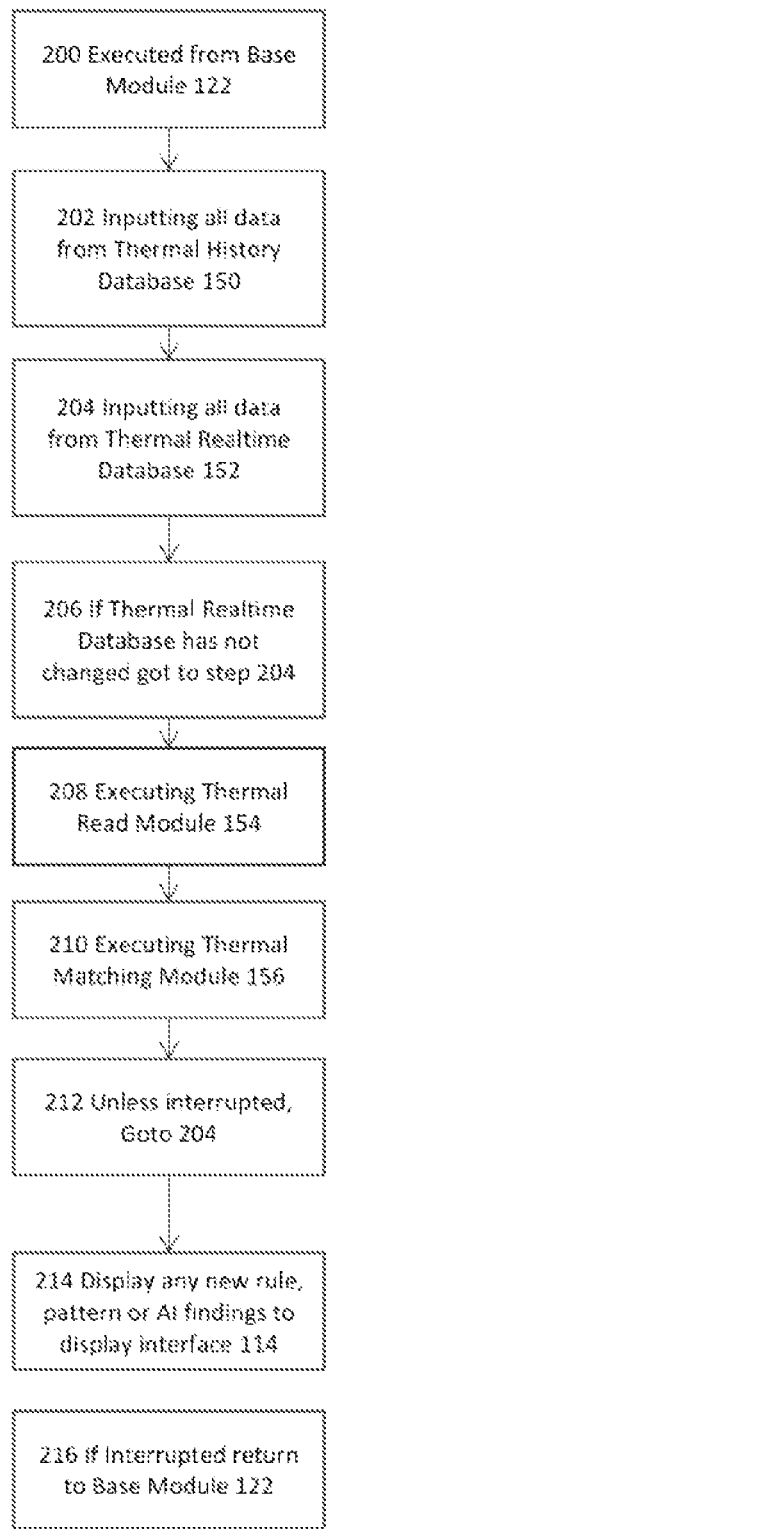
FIG. 2 is a flow diagram illustrating a process performed using a thermal base module, according to some examples.

FIG. 2 is a flow diagram illustrating a process 250 performed using a thermal base module 142. The process 250 begins with Thermal Base Module 142 executes from Base Module 122 at operation 200. Thermal Base Module 142 inputs all Thermal History Database 150 at operation 202. Thermal Base Module 142 inputs all data from Thermal Realtime Database 152, at operation 204. Suppose Thermal Realtime Database has not changed to operation 204, at operation 206. Thermal Base Module 142 executes Thermal Read Module 154 at operation 208. Thermal Base Module 142 executes Thermal Matching Module 156 at operation 210. Unless interrupted, Goto 204, at operation 212. Display any new rule, pattern, or AI findings to display interface 114, at operation 214. If Interrupted, return to Base Module 122, at operation 214.

Figure 3:
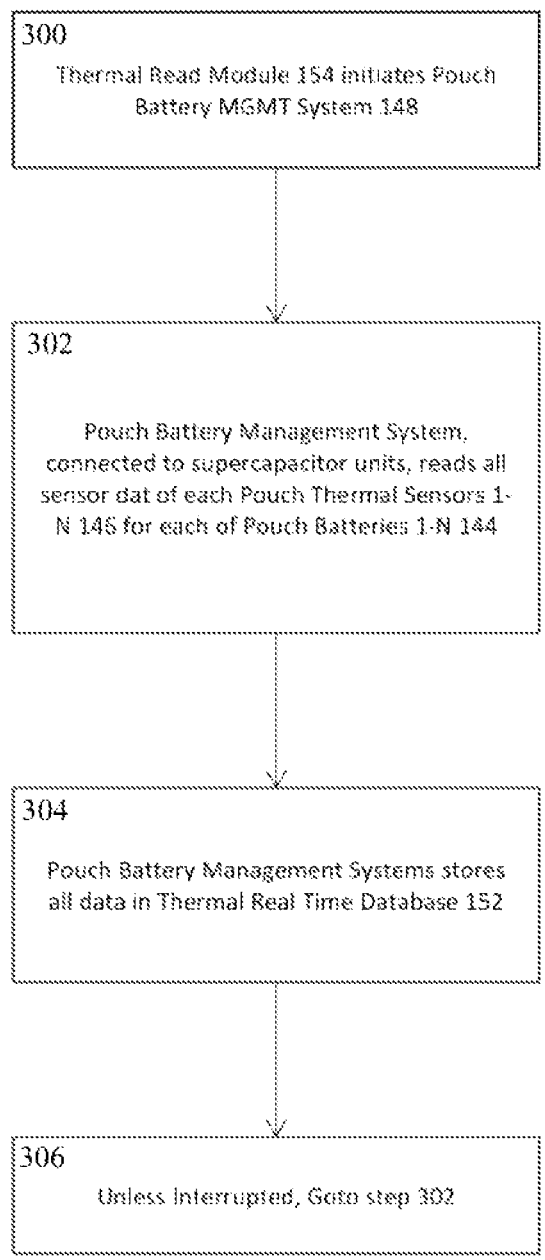
FIG. 3 is a flow diagram illustrating a process performed using a thermal read module, according to some examples.

FIG. 3 is a flow diagram illustrating a process 350 performed using a thermal read module 154. The process 350 begins with Thermal Read Module 154 initiates Pouch MGMT System 148 at operation 300. Pouch Battery Management System, connected to supercapacitor units, reads all sensor data of each Pouch Thermal Sensors 1-N 146 for each of Pouch Batteries 1-N 144. It should be noted that each pouch thermal sensor can measure the local temperature of each pouch unit and subunit (not shown). The readings can be either in Fahrenheit or Celsius. A subprogram may guide the reading of each pouch thermal sensor to identify a first pouch thermal sensor and read the temperature and the indexes to the next pouch thermal sensor until all pouch thermal sensors are read at operation 302. Pouch Battery Management Systems stores all data in Thermal Real-Time Database 152 at operation 304. Unless Interrupted, Goto operation 302 at operation 306.

Figure 4:
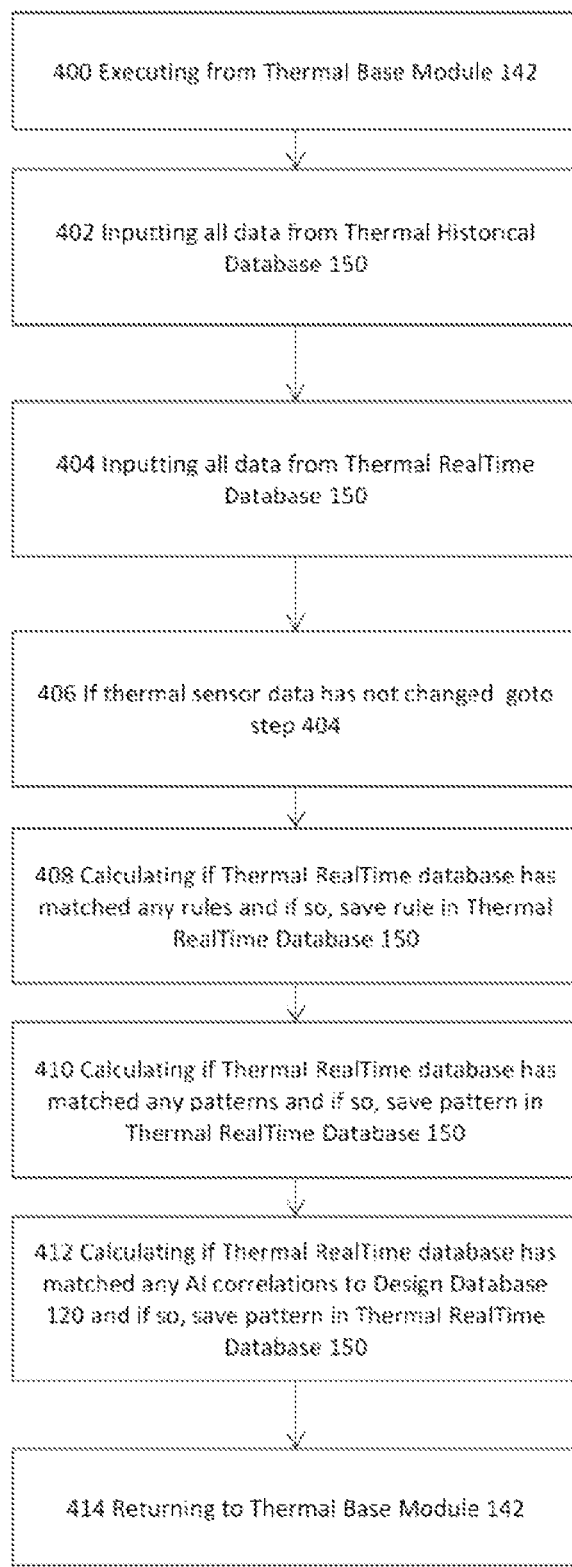
FIG. 4 is a flow diagram illustrating a process performed using a thermal matching module, according to some examples.

FIG. 4 is a flow diagram illustrating a process 450 performed using a thermal matching module 156. The process 450 begins with Thermal Matching Module 156 executed from Thermal Base Module 142, at operation 400. Thermal Matching Module 156 inputs all Thermal Historical Database 150 data at operation 402. Thermal Matching Module 156 inputs all data from Thermal RealTime Database 150, at operation 404. If thermal sensor data has not changed, go to operation 404, at operation 406. Thermal Matching Module 156 calculates if the Thermal RealTime database has matched any rules and saves rules in Thermal RealTime Database 150. In one embodiment, a rule may be that if two pouch thermal sensors (units 05 and 06) 146 are next to each other and their temperature difference is greater than ten degrees, report rule result "potential thermal sensor failure at pouch 05-06" and store in Thermal Realtime database 152. It should be noted that these rules are stored in Thermal Historical Database in advance. In another embodiment, if any thermal pouch sensor 146 is above 130 degrees, report rule "thermal runaway suspected near pouch unit 05" and store it in Thermal Realtime database 152, at operation 408. Thermal Matching Module 156 calculates if the Thermal RealTime database has matched any patterns and, if so, saves the pattern in Thermal RealTime Database 150. In one embodiment, a "pattern" may be that temperature is non-linear, changing from one region of pouch batteries 1-N 144, which may indicate an odd variation that should be checked. The patterns of change are previously stored in Thermal History Database 150. If the non-linear pattern is detected, the pattern is identified and written to Therlam Real-time database 152 as "Non-linear pattern detected between pouch thermal sensor 05 through 25, may require a service check". A random temperature fluctuation in a block of ouch thermal sensors 1-N 146 may be detected in another embodiment. This pattern may represent "system noise impacting reading sensors." This pattern is written to the Thermal Real-Time Database 152 as "system noise in block 14 may be impacting reading sensors requiring maintenance".

It should be noted there could be hundreds of patterns developed over time and stored in Thermal History database 150, so this operation would go through each pattern to check for temperature patterns, at operation 410. Thermal Matching Module 156 calculates if the Thermal RealTime database has matched any AI correlations to Design Database 120 and, if so, saves pattern in Thermal RealTime Database 150. AI is used to find correlations such as regression, convolution, etc., or it could be machine learning, either supervised or unsupervised. In this step, AI is used to match the changes of the pouch thermal sensors 1-N 145 to any data in the design database 120 that contains all data in base modules 122 sub-modules. In one embodiment, the AI may find a direct regression calculation to the average of all sensors changing to the average speed changes, which would be considered normal up to limits so that this correlation would be saved to the Termal Realtime Database 152 as "correlation found between pouch thermal sensors and speed changes." This operation (not shown) would be able to create scripts of results such as "correlation found" "between" "speed" and Pouch Thermal sensors." In another embodiment, the AI may correlate to temperature sharply dropping to the energy optimization module 124 data. This could mean the energy optimization is working correctly. The AI scripted text may read, pouch thermal sensors dropping and is correlated to the energy optimization module". This scripted result is saved in thermal RealTime Database 152, at operation 412. Thermal Matching Module 156 returns to Thermal Base Module 142, at operation 414.

Figure 5:
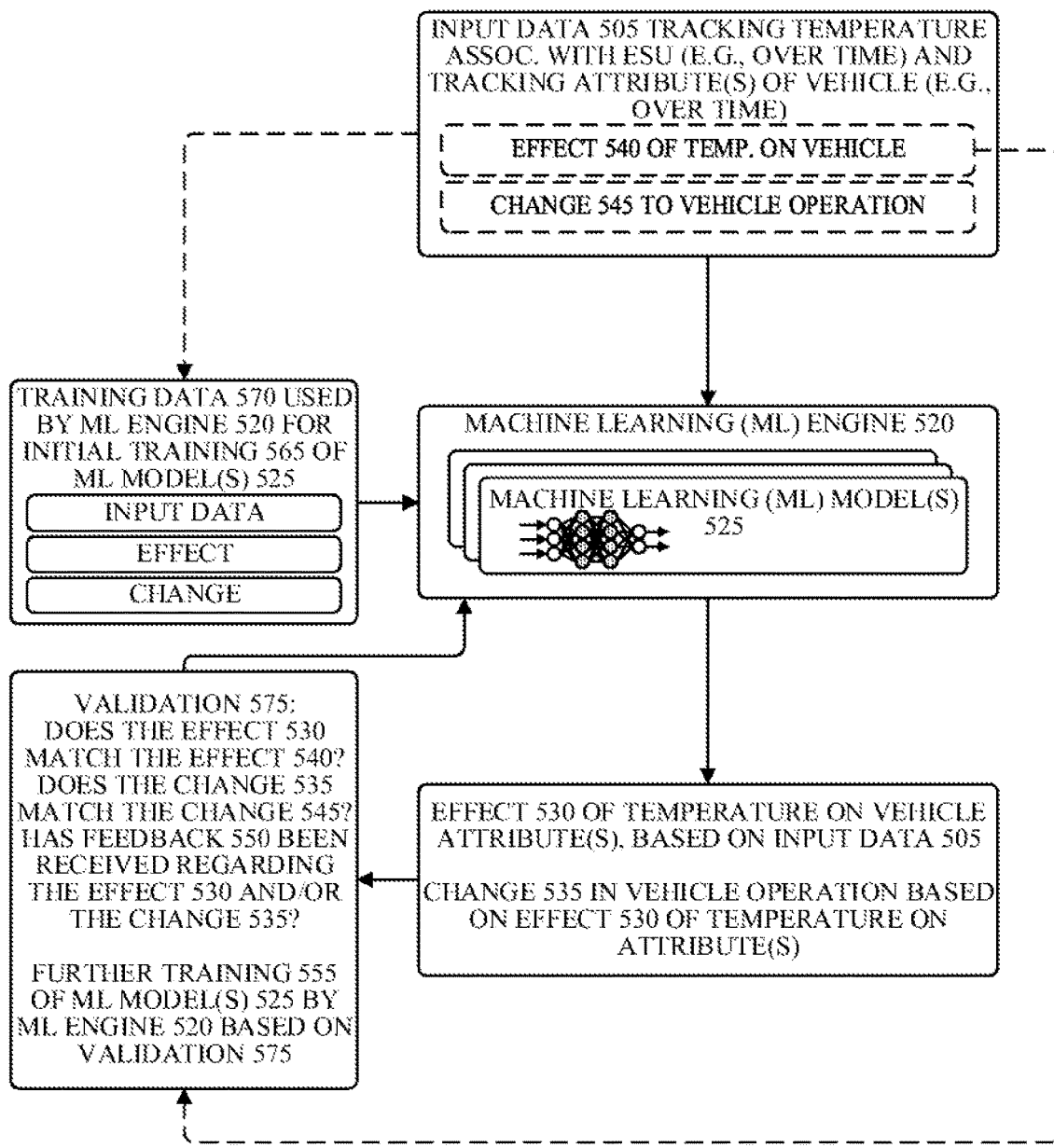
FIG. 5 is a block diagram illustrating use of one or more trained machine learning models of a machine learning engine to identify an effect of a measured temperature on attribute(s) of the vehicle, and/or to identify a change to vehicle operation of the vehicle based on the identified effect, according to some examples.

FIG. 5 is a block diagram illustrating use of one or more trained machine learning models 525 of a machine learning engine 520 to identify an effect 530 of measured a temperature on attribute(s) of the vehicle, and/or to identify a change 535 to vehicle operation of the vehicle based on the identified effect 530. The ML engine 520 and/or the ML model(s) 525 can include one or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (REs), one or more computer vision systems, one or more deep learning systems, one or more classifiers, one or more transformers, or combinations thereof. Within FIG. 5, a graphic representing the trained ML model(s) 525 illustrates a set of circles connected to another. Each of the circles can represent a node, a neuron, a perceptron, a layer, a portion thereof, or a combination thereof. The circles are arranged in columns. The leftmost column of white circles represent an input layer. The rightmost column of white circles represent an output layer. Two columns of shaded circled between the leftmost column of white circles and the rightmost column of white circles each represent hidden layers. The ML engine 520 and/or the ML model(s) 525 can be part of the AI/ML module 182.

Once trained via initial training 565, the one or more ML models 525 receive, as an input, input data 505 that identifies a temperature associated with at least one energy storage unit (ESU) (e.g., measured by at least one temperature sensor that is coupled to the at least one ESU) and attribute(s) of a vehicle (e.g., mileage, efficiency, ergonomics, aerodynamics, shape, geometry, weight, horsepower, brake power, turning radius, type, size, energy consumption rate, and the like). At least some of the input data 505 may be received from one or more sensors, such as sensors to measure speed, acceleration, rotation, orientation, location, voltage, current, resistance, capacitance, inductance, frequency, power, temperature, and/or continuity. In some examples, the one or more sensors can include one or more accelerometers, gyrometers, gyroscopes, global navigation satellite system (GNSS) receivers, inertial measurement units (IMUs), voltmeters, ammeters, ohmmeters, capacimeters, inductance meters, wattmeters, multimeters, thermometers, thermistors, or a combination thereof. In some examples, the input data 505 may be received from the design database 120, the thermal history database 150, and/or the thermal realtime database 152, where the input data 505 may be stored after measurement by various sensors of the vehicle. In some examples, for instance during validation 575, the ML engine 520 and/or the one or more ML models 525 can also receive, as an additional input, a predetermined effect 540 of the temperature on the operation of the vehicle that is based on (or otherwise corresponds to) the input data 505. In some examples, for instance during validation 575, the ML engine 520 and/or the one or more ML, models 525 can also receive, as an additional input, a predetermined change 545 in operation of the vehicle that is based on (or otherwise corresponds to) the input data 505 and/or the predetermined effect 530.

In response to receiving at least the input data 505 as an input(s), the one or more ML model(s) 525 identifies an effect 530 of temperature (e.g., from the temperature(s) in the input data 505) on attribute(s) and/or operation of the vehicle (e.g., from the attribute(s) of the vehicle in the input data 505). For instance, in some examples, at high temperatures exceeding an upper temperature threshold, certain components and or subsystems of the vehicle can degrade in performance. Similarly, in some examples, at low temperatures lower than a lower temperature threshold, certain components and or subsystems can degrade in performance. In some examples, extreme temperatures (e.g., temperatures exceeding an upper temperature threshold or lower than a lower temperature threshold) can affect chemical reactions in batteries or capacitance in supercapacitors, which can increase the risk of failure of an energy storage unit, reduce the power discharge rate of an energy storage unit, reduce power storage capacity of an energy storage unit, reduce the lifespan of an energy storage unit, or a combination thereof. In some examples, extreme temperatures (e.g., temperatures exceeding an upper temperature threshold or lower than a lower temperature threshold) can affect operation of engines, motors, brakes, actuators, and/or propulsion mechanisms of the vehicle, for instance by reducing acceleration and/or deceleration, reducing top speeds, increasing energy required to maintain speeds, increasing energy required for acceleration and/or deceleration, increasing failure rate, reducing component lifespan, or a combination thereof.

In response to receiving at least the input data 505, the effect 530, and/or the predetermined effect 540 as an input (s), the ML model(s) 525 can also identify a change 535 in vehicle operation of the vehicle based on the effect (e.g., the effect 530 and/or the effect 540) of the temperature on the attribute(s) and/or operation of the vehicle. For instance, if the measured temperature is a high temperature exceeding an upper temperature threshold, the change to vehicle operation can include imposition of limit(s) on top speed and/or acceleration of the vehicle (to reduce power draw and therefore to reduce heat generation), imposition of limit(s) on the brightness of display(s) or other light(s) of the vehicle, imposition of limit(s) on the volume of audio in the vehicle, imposition of limit(s) on total power draw rate in the vehicle, increasing fan speed of a fan (e.g., to cool down the temperature), increasing power of an active cooling system, or a combination thereof.

Identifying the effect 530 and/or the change 535 can correspond to at least operations 210, 214, 408, 410, and/or 412. It should be understood that the predetermined effect 540 and/or the predetermined change 545 can likewise include any of the types of data listed above with respect to the effect 530 and/or the change 535.

Once the one or more ML models 525 identify the effect 530 and/or the change 535—the effect 530 and/or the change 535 can be output to an output interface that can indicate the effect 530 and/or the change 535. For instance, the output interface can send a request to a vehicle control mechanism to modify vehicle operation of the vehicle according to the identified change 535 to vehicle operation of the vehicle using a communication interface. The output interface can display an indicator of the effect 530 and/or the change 535 using a display, or play audio indicative of the effect 530 and/or the change 535 using a speaker or headphones.

Before using the one or more ML models 525 to identify the effect 530 and/or the change 535, the ML engine 520 performs initial training 565 of the one or more ML models 525 using training data 570. The training data 570 can include examples of input data (e.g., as in the input data 505) and/or examples of a predetermined effect and/or the predetermined change (e.g., as in the predetermined effect 540 and/or the predetermined change 545). In some examples, the predetermined effect and/or the predetermined change in the training data 570 are previously generated by the one or more ML models 525 based on the attribute data in the training data 570. In the initial training 565, the ML engine 520 can form connections and/or weights based on the training data 570, for instance between nodes of a neural network or another form of neural network. For instance, in the initial training 565, the ML engine 520 can be trained to output the predetermined effect and/or the predetermined change in the training data 570 in response to receipt of the corresponding attribute data in the training data 570.

During a validation 575 of the initial training 565 (and/or further training 555), the input data 505 (and/or the predetermined effect and/or the predetermined change in the training data 570) is input into the one or more ML models 525 to identify the effect 530 and/or the change 535 as described above. The ML engine 520 performs validation 575 at least in part by determining whether the effect 530 matches the predetermined effect 540 (and/or the predetermined effect in the training data 570) and/or whether the change 535 matches the predetermined change 545 (and/or the predetermined change in the training data 570).

If the effect 530 match the predetermined effect 540 during validation 575, then the ML engine 520 performs further training 555 of the one or more ML models 525 by updating the one or more ML models 525 to reinforce weights and/or connections within the one or more ML models 525 that contributed to the identification of the effect 530, encouraging the one or more ML models 525 to identify a similar effect given similar inputs. Similarly, if the change 53S matches the predetermined change 545 during validation 575, then the ML engine 520 performs further training 555 of the one or more ML models 525 by updating the one or more ML models 525 to reinforce weights and/or connections within the one or more ML models 525 that contributed to the identifying of the change 535, encouraging the one or more ML models 525 to identify a similar change given similar inputs.

If the effect 530 does not match the predetermined effect 540 during validation 575, then the ML engine 520 performs further training 555 of the one or more ML models 525 by updating the one or more ML models 525 to weaken, remove, and/or replace weights and/or connections within the one or more ML models that contributed to the identification of the effect 530, discouraging the one or more ML models 525 from identifying a similar effect given similar inputs. Similarly, if the change 535 does not match the predetermined change 545 during validation 575, then the ML engine 520 performs further training 555 of the one or more ML, models 525 by updating the one or more ML models 525 to weaken, remove, and/or replace weights and/or connections within the one or more ML models that contributed to the identification of the change 535, discouraging the one or more ML models 525 from identifying a similar change given similar inputs.

Validation 575 and further training 555 of the one or more ML models 525 can continue once the one or more ML models 525 are in use based on feedback 550 received regarding the effect 530 and/or the change 535. In some examples, the feedback 550 can be received from a user via a user interface, for instance via an input from the user interface that approves or declines use of the effect 530 and/or the change 535. In some examples, the feedback 550 can be received from another component or subsystem of the vehicle (e.g., an energy control system), for instance based on whether the component or subsystem successfully uses the effect 530 and/or the change 535, whether use the effect 530 and/or the change 535 causes any problems for the component or subsystem (e.g., which may be detected using the sensors), whether use the effect 530 and/or the change 535 are accurate, or a combination thereof. If the feedback 550 is positive (e.g., expresses, indicates, and/or suggests approval of the effect 530 and/or the change 535, success of the effect 530 and/or the change 535, and/or accuracy the effect 530 and/or the change 535), then the ML engine 520 performs further training 555 of the one or more ML models 525 by updating the one or more ML models 525 to reinforce weights and/or connections within the one or more ML models 525 that contributed to the generation of the effect 530 and/or the change 535, encouraging the one or more ML models 525 to generate similar effect(s) and/or change(s) given similar inputs. If the feedback 550 is negative (e.g., expresses, indicates, and/or suggests disapproval of the effect 530 and/or the change 535, failure of the effect 530 and/or the change 535, and/or inaccuracy of the effect 530 and/or the change 535) then the ML engine 430 performs further training 555 of the one or more ML models 525 by updating the one or more ML models 525 to weaken, remove, and/or replace weights and/or connections within the one or more ML models that contributed to the generation of the effect 530 and/or the change 535, discouraging the one or more ML models 525 from generating similar effect(s) and/or change(s) given similar inputs.

Figure 6:
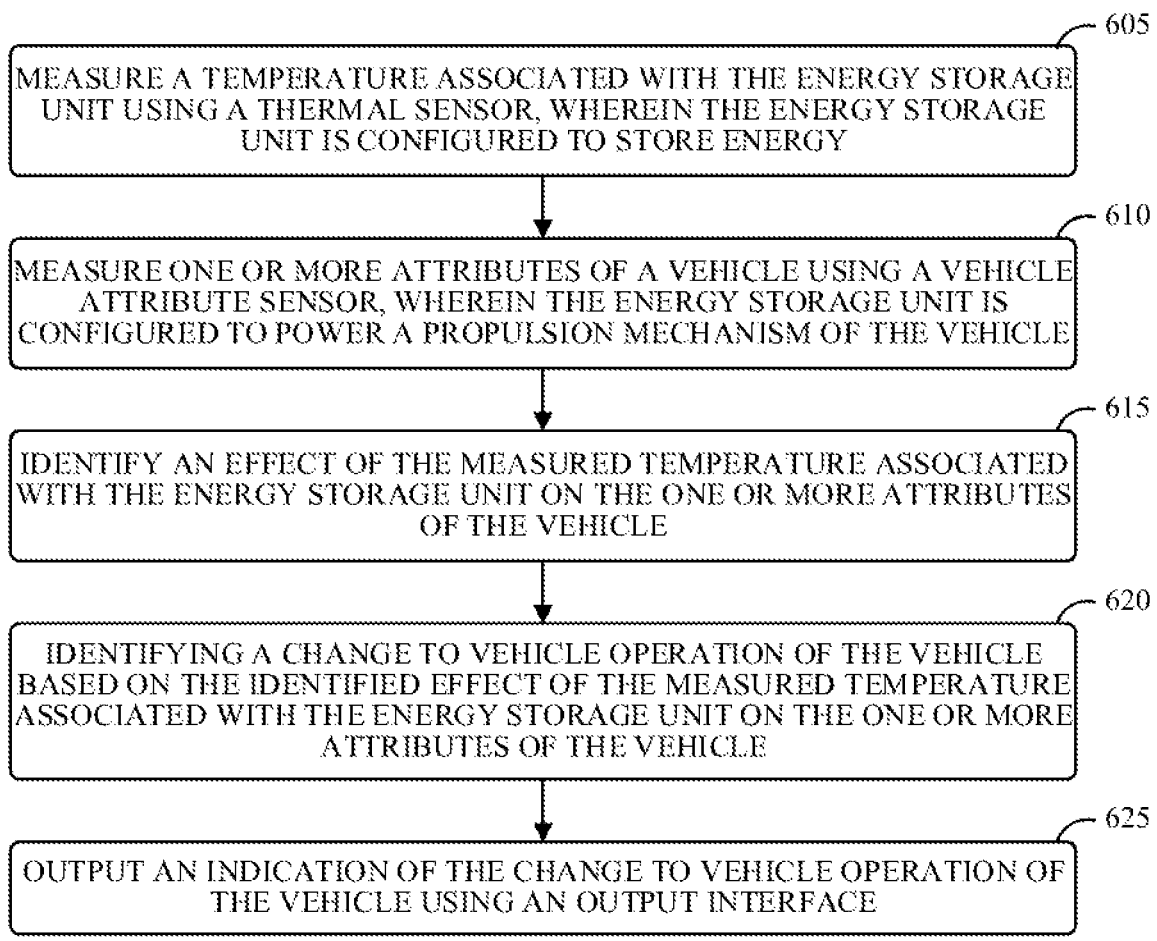
FIG. 6 is a flow diagram illustrating a process for temperature-based vehicle operation analysis performed using a control system, according to some examples.

FIG. 6 is a flow diagram illustrating a process 600 for temperature-based vehicle operation analysis performed using a control system, according to some examples. The control system that performs the process 600 can the energy management system 100, the electric vehicle 102, energy management network and database 104, the cloud 106, the supercapacitor units 108 (and/or other ESUs such as batteries), the design database 120, the base module 122, the capability database 164, any system(s) that perform any of the processes of any of FIGS. 2-4, the ML engine 520 of FIG. 5, an apparatus, a non-transitory computer-readable storage medium coupled to a processor, component(s) or subsystem(s) of any of these systems, or a combination thereof.

At operation 605, the control system is configured to, and can, measure a temperature associated with the energy storage unit using a thermal sensor (e.g., pouch thermal sensors 146). The energy storage unit is configured to store energy.

In some examples, the control system includes a thermal management database (e.g., thermal history database 150 and/or thermal realtime database 152) that is configured to store data tracking the temperature associated with the energy storage unit over time, wherein the control system is configured to identify the effect of the measured temperature associated with the energy storage unit on the one or more attributes of the vehicle based on the data tracking the temperature associated with the energy storage unit over time.

At operation 610, the control system is configured to, and can, measure one or more attributes of a vehicle using a vehicle attribute sensor. The energy storage unit is configured to power a propulsion mechanism of the vehicle.

In some examples, the control system includes a vehicle management database that is configured to store data tracking the one or more attributes of the vehicle over time, wherein the control system is configured to identify the effect of the measured temperature associated with the energy storage unit on the one or more attributes of the vehicle based on the data tracking the one or more attributes of the vehicle over time.

At operation 615, the control system is configured to, and can, identify an effect of the measured temperature associated with the energy storage unit on the one or more attributes of the vehicle.

In some examples, the control system is configured to, and can, identify a pattern (e.g., as in operations 408, 410, and/or 412) in data tracking the temperature associated with the energy storage unit over time (e.g., from the thermal management database, the thermal history database 150, and/or the thermal realtime database 152) and/or in data tracking the one or more attributes of the vehicle over time (e.g., from the vehicle management database) to identify the effect of the measured temperature associated with the energy storage unit on the one or more attributes of the vehicle.

In some examples, the control system is configured to, and can, identify a correlation (and/or association, and/or link, and/or causation) between data tracking the temperature associated with the energy storage unit over time (e.g., from the thermal management database) and data tracking the one or more attributes of the vehicle over time (e.g., from the vehicle management database) to identify the effect of the measured temperature associated with the energy storage unit on the one or more attributes of the vehicle.

In some examples, the control system is configured to, and can, input the measured temperature associated with the energy storage unit and the one or more attributes of the vehicle (e.g., the input data 505) into a trained machine learning model (e.g., ML model(s) 525) to identify the effect (e.g., effect 530) of the measured temperature associated with the energy storage unit on the one or more attributes of the vehicle. In some examples, the control system is configured to, and can, input historical data tracking the measured temperature over time and tracking the one or more attributes of the vehicle over time into the trained machine learning model to identify the effect of the measured temperature associated with the energy storage unit on the one or more attributes of the vehicle. In some examples, the control system is configured to use the identified effect of the measured temperature associated with the energy storage unit on the one or more attributes of the vehicle as training data to update the trained machine learning model (e.g., as in the additional training 555).

At operation 620, the control system is configured to, and can, identify a change (e.g., change 535) to vehicle operation of the vehicle based on the identified effect (e.g., effect 530) of the measured temperature associated with the energy storage unit on the one or more attributes of the vehicle.

In some examples, the control system is configured to input the identified effect (e.g., effect 530, effect 540) of the measured temperature associated with the energy storage unit on the one or more attributes of the vehicle into a trained machine learning model (e.g., ML model(s) 525) to identify the change (e.g., change 535) to vehicle operation of the vehicle. In some examples, the control system is configured to, and can, input historical data tracking the measured temperature over time and tracking the one or more attributes of the vehicle over time into the trained machine learning model to identify the effect of the measured temperature associated with the energy storage unit on the one or more attributes of the vehicle. In some examples, the control system is configured to use the identified effect of the measured temperature associated with the energy storage unit on the one or more attributes of the vehicle as training data to update the trained machine learning model (e.g., as in the additional training 555).

At operation 625, the control system is configured to, and can, output an indication of the change to vehicle operation of the vehicle using an output interface.

In some examples, to output the indication, the control system is configured to, and can, use the output interface to send a request to a vehicle control mechanism to modify vehicle operation of the vehicle according to the identified change to vehicle operation of the vehicle. In some examples, to control system the indication, the control system is configured to, and can, use the output interface to display the indication using a display.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Aspects of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other types of media/machine-readable medium suitable for storing electronic instructions (e.g., computer programming code, such as software or firmware). Moreover, aspects of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A system for temperature-based vehicle operation analysis, the system comprising:
an energy storage unit that stores energy;
a thermal sensor that measures a temperature associated with the energy storage unit;
a vehicle attribute sensor that measures one or more attributes of a vehicle, wherein the energy storage unit powers a propulsion mechanism of the vehicle;
a control system comprising a processor that has access to a memory, wherein the control system identifies an effect of the measured temperature associated with the energy storage unit on the one or more attributes of the vehicle, wherein the control system identifies a change to vehicle operation of the vehicle to reduce the identified effect of the measured temperature associated with the energy storage unit on the one or more attributes of the vehicle, wherein the change to the vehicle operation of the vehicle is associated with a limit, wherein the control system automatically controls the propulsion mechanism to impose the limit on the propulsion mechanism, wherein imposing the limit on the propulsion mechanism implements; the change to the vehicle operation of the vehicle to reduce the identified effect of the measured temperature associated with the energy storage unit on the one or more attributes of the vehicle.

2. The system of claim 1, further comprising:
a thermal management database that stores data tracking the temperature associated with the energy storage unit over time, wherein the control system identifies the effect of the measured temperature associated with the energy storage unit on the one or more attributes of the vehicle based on the data tracking the temperature associated with the energy storage unit over time.

3. The system of claim 2, wherein the control system is identifies a pattern in the data tracking the temperature associated with the energy storage unit over time to identify the effect of the measured temperature associated with the energy storage unit on the one or more attributes of the vehicle.

4. The system of claim 1, further comprising:
a vehicle management database that stores data tracking the one or more attributes of the vehicle over time, wherein the control system identifies the effect of the measured temperature associated with the energy storage unit on the one or more attributes of the vehicle based on the data tracking the one or more attributes of the vehicle over time.

5. The system of claim 4, wherein the control system identifies a pattern in the data tracking the one or more attributes of the vehicle over time to identify the effect of the measured temperature associated with the energy storage unit on the one or more attributes of the vehicle.

6. The system of claim 1, wherein the control system identifies a correlation between data tracking the temperature associated with the energy storage unit over time and data tracking the one or more attributes of the vehicle over time to identify the effect of the measured temperature associated with the energy storage unit on the one or more attributes of the vehicle.

7. The system of claim 1, wherein the control system inputs the measured temperature associated with the energy storage unit and the one or more attributes of the vehicle into a trained machine learning model to identify the effect of the measured temperature associated with the energy storage unit on the one or more attributes of the vehicle.

8. The system of claim 1, wherein the control system inputs historical data into a trained machine learning model to identify the effect of the measured temperature associated with the energy storage unit on the one or more attributes of the vehicle, wherein the historical data tracks the measured temperature and the one or more attributes of the vehicle over time.

9. The system of claim 7, wherein the control system uses the identified effect of the measured temperature associated with the energy storage unit on the one or more attributes of the vehicle as training data to update the trained machine learning model.

10. The system of claim 1, wherein the control system inputs the identified effect of the measured temperature associated with the energy storage unit on the one or more attributes of the vehicle into a trained machine learning model to identify the change to the vehicle operation of the vehicle.

11. The system of claim 1, wherein the control system inputs historical data tracking the identified effect over time into a trained machine learning model to identify the change to the vehicle operation of the vehicle.

12. The system of claim 10, wherein the control system uses the identified change to the vehicle operation of the vehicle as training data to update the trained machine learning model.

13. The system of claim 1, further comprising:
an output interface that outputs an indication of the change to the vehicle operation of the vehicle.

14. The system of claim 1, further comprising:

an output interface that displays an indication of the change to the vehicle operation of the vehicle using a display.

15. A method for temperature-based vehicle operation analysis, the method comprising:
   measuring a temperature associated with an energy storage unit using a thermal sensor, wherein the energy storage unit stores energy;
   measuring one or more attributes of a vehicle using a vehicle attribute sensor, wherein the energy storage unit powers a propulsion mechanism of the vehicle;
   identifying an effect of the measured temperature associated with the energy storage unit on the one or more attributes of the vehicle;
   identifying a change to vehicle operation of the vehicle to reduce the identified effect of the measured temperature associated with the energy storage unit on the one or more attributes of the vehicle, wherein the change to the vehicle operation of the vehicle is associated with a limit; and
   automatically controlling the propulsion mechanism to impose the limit on the propulsion mechanism of the vehicle, wherein imposing the limit on the propulsion mechanism implements the change to the vehicle operation of the vehicle, to reduce the identified effect of the measured temperature associated with the energy storage unit on the one or more attributes of the vehicle.

16. The method of claim 15, wherein identifying the effect of the measured temperature associated with the energy storage unit on the one or more attributes of the vehicle includes:
   identifying a correlation between data tracking the temperature associated with the energy storage unit over time and data tracking the one or more attributes of the vehicle over time.

17. The method of claim 15, wherein identifying the effect of the measured temperature associated with the energy storage unit on the one or more attributes of the vehicle includes:
   inputting the measured temperature associated with the energy storage unit and the one or more attributes of the vehicle into a trained machine learning model.

18. The method of claim 15, wherein identifying the change to the vehicle operation of the vehicle includes:
   inputting the identified effect of the measured temperature associated with the energy storage unit on the one or more attributes of the vehicle into a trained machine learning model.

19. The method of claim 15, further comprising:
   outputting an indication of the change to the vehicle operation of the vehicle.

20. A non-transitory computer readable storage medium having embodied thereon a program, wherein the program is executable by a processor to perform a method of temperature-based vehicle operation analysis, the method comprising:
   measuring a temperature associated with an energy storage unit using a thermal sensor, wherein the energy storage unit stores energy;
   measuring one or more attributes of a vehicle using a vehicle attribute sensor, wherein the energy storage unit powers a propulsion mechanism of the vehicle;
   identifying an effect of the measured temperature associated with the energy storage unit on the one or more attributes of the vehicle;
   identifying a change to vehicle operation of the vehicle to reduce the identified effect of the measured temperature associated with the energy storage unit on the one or more attributes of the vehicle, wherein the change to the vehicle operation of the vehicle is associated with a limit; and
   automatically controlling the propulsion mechanism to impose the limit on the propulsion mechanism of the vehicle, wherein imposing the limit on the propulsion mechanism implements the change to the vehicle operation of the vehicle, to reduce the identified effect of the measured temperature associated with the energy storage unit on the one or more attributes of the vehicle.

* * * * *